United States Patent
Onagi et al.

(10) Patent No.: US 7,852,723 B2
(45) Date of Patent: *Dec. 14, 2010

(54) DISK DRIVE SYSTEM EMPLOYING EFFECTIVE DISK SURFACE STABILIZATION MECHANISM

(75) Inventors: Nobuaki Onagi, Kanagawa (JP);
Yasutomo Aman, Kanagawa (JP);
Shozo Murata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/652,027

(22) Filed: Jan. 11, 2007

(65) Prior Publication Data

US 2007/0286045 A1  Dec. 13, 2007

Related U.S. Application Data

(62) Division of application No. 10/123,006, filed on Apr. 16, 2002, now Pat. No. 7,233,554.

(30) Foreign Application Priority Data

| Apr. 17, 2001 | (JP) | 2001-118344 |
| May 28, 2001 | (JP) | 2001-158663 |
| Jul. 30, 2001 | (JP) | 2001-228943 |
| Aug. 24, 2001 | (JP) | 2001-253896 |
| Sep. 19, 2001 | (JP) | 2001-284299 |
| Jan. 28, 2002 | (JP) | 2002-018323 |

(51) Int. Cl.
*G11B 11/095* (2006.01)
*G11B 27/36* (2006.01)

(52) U.S. Cl. ............... 369/53.18; 369/53.13; 369/53.28; 360/97.02; 360/224; 720/695

(58) Field of Classification Search .............. 369/53.18, 369/30.65, 53.13, 53.28, 44.32; 360/234.2, 360/130.34, 266.2, 99.01, 97.03, 133; 219/121.68; 720/725, 659

See application file for complete search history.

(56) References Cited

U.S. PATENT DOCUMENTS

| 4,641,152 A | 2/1987 | Fedder et al. |
| 5,077,726 A * | 12/1991 | Dodds et al. ................. 720/725 |
| 5,101,385 A | 3/1992 | Farnsworth et al. |
| 5,189,574 A | 2/1993 | Imamura et al. |
| 5,293,287 A | 3/1994 | Tzur et al. |

(Continued)

FOREIGN PATENT DOCUMENTS

JP  7-105657  4/1995

(Continued)

*Primary Examiner*—Peter Vincent Agustin
*Assistant Examiner*—Kim-Kwok Chu
(74) *Attorney, Agent, or Firm*—Dickstein Shapiro LLP

(57) ABSTRACT

A stabilization part stabilizes surface vibration of a flexible optical disk along a rotation axis direction of the optical disk by means of pressure difference of air flow created according to Bernoulli's law at a portion on which information writing/reading is performed, provided on a side of the optical disk opposite to a side on which information recording/reproducing is performed. In this case, areas are provide on the upstream side and down stream side along the disk rotation direction of the portion of the optical disk which is stabilized by said stabilization part, said areas of the optical disk not having pressure difference created thereon by the air flow.

24 Claims, 24 Drawing Sheets

U.S. PATENT DOCUMENTS

| | | |
|---|---|---|
| 5,390,059 A | 2/1995 | Tokuyama et al. |
| 5,537,281 A * | 7/1996 | Ma et al. .................... 360/133 |
| 6,353,590 B1 * | 3/2002 | Knudsen et al. ............. 369/115 |
| 6,396,783 B1 | 5/2002 | Bell et al. |
| 6,449,119 B1 * | 9/2002 | Hashizume et al. ...... 360/97.03 |

FOREIGN PATENT DOCUMENTS

| | | |
|---|---|---|
| JP | 10-308059 | 11/1998 |

\* cited by examiner

DISK MOVEMENT DIRECTION

GUIDE SURFACE CURVATURE BOUNDARY LINE

GUIDE SURFACE CURVATURE BOUNDARY LINE

DISK ROTATION DIRECTION

GUIDE SURFACE CURVATURE BOUNDARY LINE

DISK DRIVE SYSTEM EMPLOYING EFFECTIVE DISK SURFACE STABILIZATION MECHANISM

This is a divisional application of U.S. patent application Ser. No. 10/123,006, filed on Apr. 16, 2002 now U.S. Pat. No. 7,233,554, the entire disclosure of which is incorporated herein by reference.

BACKGROUND OF THE INVENTION

1. Field of the Invention

The present invention relates to a disk drive system employing a disk surface stabilization mechanism, and, in particular, an optical disk drive for carrying out rotation drive of an optical disk which is an optical information recording medium in a form of sheet which has a flexibility, an optical information recording device, an optical information reproduction device, and a disk cartridge used therefor.

2. Description of the Related Art

Optical disks are demanded to store mass digitized data, as digitization of television broadcasting starts in recent years. A basic method of improving recording density on the optical disks is to reduce the diameter of a beam spot used for recording/reproduction information onto/from the optical disk.

For this reason, it is effective to shorten in wavelength of light used for recording/reproduction, and also, it is effective to enlarge numerical aperture NA of an object lens applied there. As for the wavelength of light, the wavelength of approximately 650 nm of red light is used on DVD while 780 nm of near infrared light is used on CD. Recently, a semiconductor laser of purple-blue light has been developed and it is expected that approximately 400 nm laser light will be practically used.

Moreover, the object lens for CD has less than 0.5 NA while the object lens for DVD has approximately 0.6 NA. It is demanded that the numeral aperture (NA) be enlarged further to 0.7 or more, from now on. However, enlarging NA of the object lens and shortening the wavelength of light may result in increase in influence of aberration in case the light applied is weakened. Therefore, the margin of tilt on the optical disk may decrease. Moreover, since the depth of focus becomes smaller by enlarging NA, it will be necessary to increase focus servo accuracy in the optical disk drive.

Furthermore, since the distance between the object lens and record surface of an optical disk becomes smaller by using the object lens of high NA, the object lens and optical disk may collide before focus servo control operation at the beginning thereof, unless surface vibration or axial runout on the disk is sufficiently controlled.

For example, as the O PLUS E (vol. 20, No. 2) discloses on page 183, as a large-capacity optical disk drive system having a short wavelength and high NA, a record film is formed on a rigid and thick substrate as in CD, and, light for recording/reproducing is not made to pass through the substrate, but recording/reproducing is made onto the record film through a thin cover layer is proposed.

Moreover, Japanese laid-open patent application No. 7-105657 and Japanese laid-open patent application No. 10-308059 disclose a method of stabilizing surface vibration on optical disk as a result of a flexible optical disk being rotated on a specially provided stabilization plate having a plane surface.

However, in case the substrate of optical disk is made of a rigid body, it is necessary to manufacture the optical disk at a very high accuracy and also to form the record film at a very low temperature condition in order to sufficiently reduce surface vibration and/or tilt of the disk which is rotating at high speed. Such requirements may reduce the yield of products, which may result in cost rise of optical disks.

Moreover, by the method for rotating an optical disk with flexibility on the stabilization plate, if it is made to rotate on a simple plane surface as disclosed by Japanese laid-open patent application No. 10-308059, the optical disk and the stabilization plate may touch and slide. For this reason, the optical disk may vibrate, and surface vibration at high frequency may occur. Such a type of surface vibration at high frequency may fall in a frequency range for which mechanical focus servo control cannot deal with, and, thereby, residual servo error may not be sufficiently eliminated.

Furthermore, if the optical disk and object lens slide mutually due to surface vibration, dirt/dust may be generated thereby, which then may cause various error. Especially, as Japanese laid-open patent application No. 7-105657 discloses, the record film of an optical disk may be damaged in the case the record film is provided on the side facing the stabilization plate, which may directly result in recording/reproducing error.

SUMMARY OF THE INVENTION

An object of the present invention is to provide an optical disk drive which solves the above-mentioned problems, can eliminate surface vibration of the optical disk by means of air force, can enable high-density record in case recording/reproduction is performed using an optical disk in a form of flexible sheet, and can prevent generating of error such as that caused due to slide contact to the object lens, optical information recording device, optical information reproducing device, and a disk cartridge used therefor.

An optical disk drive according to the present invention comprises:

a driving part driving a flexible optical disk; and a stabilization part, stabilizing vibration of the optical disk along the rotation axis direction of the optical disk by means of pressure difference of air flow created according to Bernoulli's law at a portion of the optical disk on which information writing/reading is performed, provided on a side of the optical disk opposite to a side on which information recording/reproducing is performed, wherein areas are provide on the upstream side and down stream side along the disk rotation direction of the portion of the optical disk which is stabilized by said stabilization part, said areas of the optical disk acting as escapes having no pressure difference created thereon by the air flow.

By providing the areas of the optical disk having no pressure difference created due to the air flow according to Bernoulli's low caused by the stabilization part, these areas acting as 'escape', and thus, it is possible to effectively reduce repulsive force occurring in the portion at which the stabilization effect should be performed on by means of the stabilization part. Thus, the stabilization effect there can be increased effectively.

According to another aspect of the present invention, an information recording/reproducing device comprises:

a head mechanism provided on one side of a flexible disk recording medium and performing information recording/reproducing onto the disk recording medium;

a guide member provided on the other side of the disk recording medium and controlling positional change such as surface vibration of the disk recording medium; and a projection amount control mechanism controlling a projection amount of said guide member with respect to the disk recording medium.

Thereby, it is possible to effectively reduce the required movable range of the object lens, thus to reduce the weight of the optical head, and, thereby, to achieve the optical head having improved high-frequency response performance.

According to another aspect of the present invention, a method of controlling an optical recording/reproducing device which comprises a driving part driving and rotating a flexible optical disk; a pickup performing optical reading/writing onto a recording surface of the optical disk; and a stabilization guide member provided on a side of the optical disk opposite to a side of the recording surface, and stabilizing surface vibration of the optical disk at a portion on which writing/reading is performed by means of pressure difference of air flow according to Bernoulli's law, comprises the step of:

controlling tilt angles of the stabilization guide member along a disk radius direction and along a disk rotation tangential direction.

Thereby, it is possible to accurately control an area on the optical disk at which the stabilization effect caused by the stabilization guide member is most effectively performed on, and, thus, it is possible to perform recording/reproducing on a desired area of the optical disk which area is best stabilized from surface vibration, and, thus, to achieve high-quality information recording/reproducing.

According to another aspect of the present invention, a method of controlling an optical recording/reproducing device which comprises a driving part driving and rotating a flexible optical disk; and a stabilization guide member provided on a side of the optical disk opposite to a side of a recording surface, and stabilizing surface vibration of the optical disk at a portion on which writing/reading is performed by means of pressure difference of air flow according to Bernoulli's law, comprises the step of:

controlling a position of the stabilization guide member along a disk rotation axis direction based on a position of a portion of the optical disk on which writing/reading is performed and rotation speed of the optical disk.

In this method, it is preferable that a surface vibration stabilization state is previously measured on case of changing the position of the stabilization guide member along the disk rotational axis direction and disk rotation speed for particular types of optical disk, then, based thereon, a pattern on the above-mentioned positional control of the stabilization guide member is previously set for the particular types of optical disk, and, thus, the pattern applied is selected according to the type of optical disk applied.

Thereby, it is possible to properly and positively control surface vibration on the optical disk by means of the stabilization guide member at an arbitrary portion of the optical disk which information recording/reproducing is performed.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Figure 1:
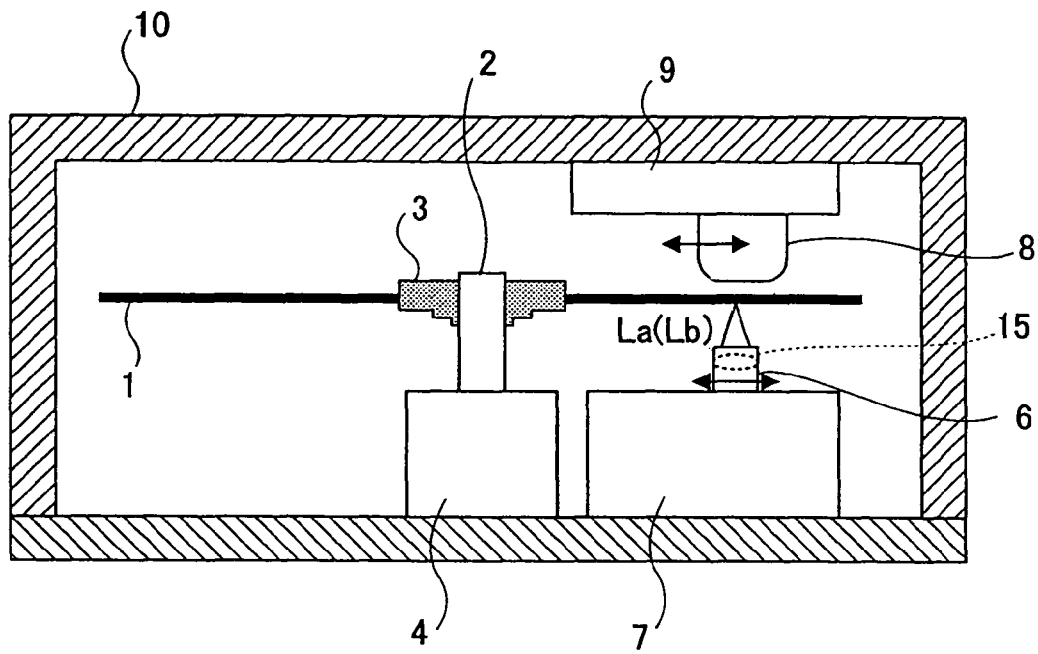
FIG. 1 shows a side-elevational sectional view of an optical information recording/reproducing device in a first embodiment of the present invention.

As shown in FIG. 1, in an optical information recording/reproducing device in a first embodiment of the present invention, a sheet-like optical disk 1 has a flexibility, a spindle shaft 2 holds a hub 3 of the optical disk 1, a spindle motor 4 carries out rotation drive of the spindle shaft 2, an optical pickup 6 writes/reads information onto/from the optical disk 1, a positioning mechanism 7 for the pickup moves the optical pickup 6 along the radius direction of the optical disk 1, and a stabilization guide member 8 is provided on the opposite side from the optical pickup with respect to the optical disk 1, and prevents surface vibration of the optical disk 1. A positioning mechanism 9 moves the stabilization guide member 8 together with the optical pickup 6 along the radius direction of the optical disk 1. These respective members/components are held by a device body 10.

Figures 2A, 2B:
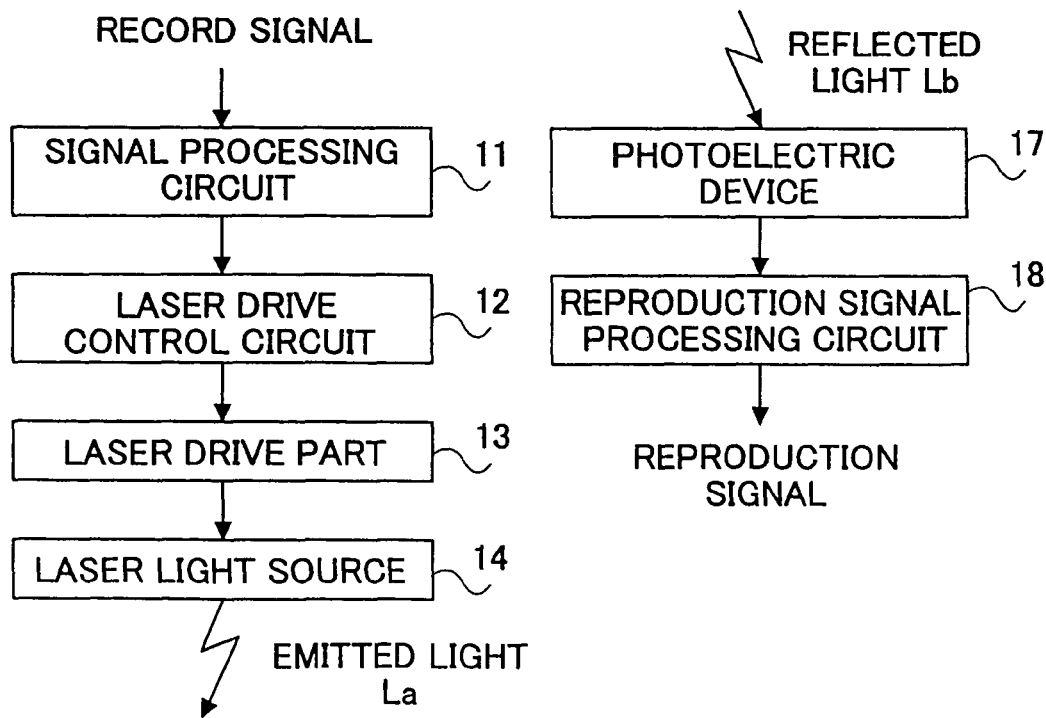
FIGS. 2A and 2B illustrate a recording part and a reproducing part of an optical pickup shown in FIG. 1.

FIGS. 2A and 2B illustrate a recording unit and a reproducing unit both of which the above-mentioned optical pickup 6 acts. As shown in FIG. 2A, in the recording unit, a signal processing circuit 11 performs a digital signal processing, signal compression processing, etc. onto an input record signal as shown in FIG. 2A. A laser drive control circuit 12 generates a laser drive control signal based on the output from the signal processing circuit 11. A laser drive part 13 drives a laser light source 14 including a semiconductor laser etc. in response to the output from the laser drive control circuit 12. The laser light La of high emission energy emitted from the laser light source 14 is condensed by an object lens 15 of the optical pickup 6 shown in FIG. 1, the record surface of the optical disk 1 is irradiated by an optical spot (laser spot) thereof, and information recording by bit formation is performed thereby onto the optical disk 1.

As the reproducing unit, the optical pickup 6 includes a photoelectric conversion device 17 of a photodiode of the like, and a reproduction signal processing circuit 18, etc, as shown in FIG. 2B. Thereby, emission of laser light at low energy from the laser light source 14 is applied to record bits formed in the record surface of the optical disk 1, the reflected light Lb therefrom is input to the photoelectric conversion device through the object lens 15. Then, signal decompression processing etc. is performed on the output from the photoelectric conversion device 17 in the reproduction signal processing circuit 18, and thus, a reproduction signal is generated accordingly.

Figure 3:
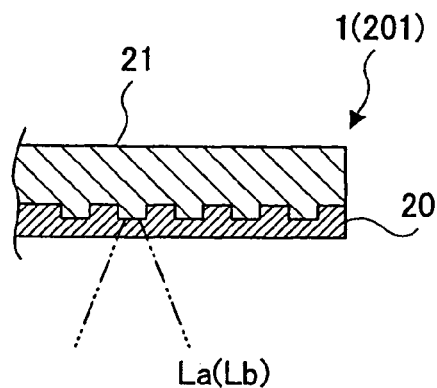
FIG. 3 illustrates a side-elevational sectional view of an optical disk shown in FIG. 1.

As shown in FIG. 3, the optical disk 1 in the sectional view of the figure includes a record layer 20 facing the object lens 15 of the optical pickup 6, and a substrate 21 facing the stabilization guide member 8, in a condition in which the disk 1 is set onto a chucking part of the spindle shaft 2.

An example of the optical disk 1 in the first embodiment will now be described in detail. In order to give flexibility in the substrate, approximately 0.1 mm of thin sheet is used. For example, grooves having a pitch of stamper of 0.6 micrometers and a width of 0.3 micrometers are transferred by heat transfer onto a sheet with a thickness of 80 micrometers made of polyethilene telefthalate, and then, through sputtering, a sheet/Ag reflective layer is formed thereon by films of 120 nm/($ZrO_2Y_2O_3$)—$SiO_2$, 7 nm/AgInSbTeGe, 10 nm/ZnS—$SiO_2$, and 25 nm/$Si_3N_4$ Membranes formed in the stated order. Then, on this sheet, UV resin is coated through spin-coating, and then is set by ultraviolet-ray application so that a transparent protection film of 5 micrometers is formed. Further, as a result of a large diameter of laser beam being applied onto the record layer of the thus-produced disk, the record layer is melted and crystallized. As a result, the reflectance thereof is improved.

Surface vibration stabilization of the sheet-like optical disk which has flexibility according to the first embodiment of the present invention will now be described with reference to FIG. 4. At a time of recording/reproduction, the optical disk 1 which has flexibility of the above-mentioned configuration is rotated between the optical pickup 6 and stabilization guide member 8. The rotating optical disk 1, in itself, though it is small, has rigidity, and a force occurs therein by which the disk 1 becomes a straight/plane state by the action of centrifugal force (referred to as a disk self-stretching force, hereinafter). Therefore, by causing the stabilization guide member 8 to approach the optical disk 1, a repulsive force is generated due to pressure difference of air flow according to Bernoulli's law, and, surface vibration or axial runout (along the direction of disk rotation axis) on the optical disk 1 can be effectively reduced as a result of the above-mentioned disk self-stretching force and the repulsive force given by the stabilization guide member 8 being applied to the disk 1 with a good balance therebetween.

According to the first embodiment, the entire surface of the record layer 20 of the optical disk 1 is not made to be faced by the stabilization guide member 8. For example, as shown in FIG. 4, a pillar-like stabilization guide member 8 whose end facing the optical disk 1 has a longitudinal sectional shape of an arc. Thereby, onto portions B and C on the upstream side and downstream side of a portion A on which the stabilization from surface vibration of disk is applied by the stabilization guide member 8 through the above-mentioned air force, this air force generated by the stabilization guide member 8 is prevented from being applied. Accordingly, repulsive force otherwise occurring in the disk 1 can be effectively reduced on the portion A as the repulsive force can be absorbed by the portions B and C instead. Thus, the portions B and C in the peripheries of the relevant portion A act as "escape". By this ingenuity, the effect of the stabilization by air force increase at the portion A.

Furthermore, the stabilization guide member 8 faces the optical disk 1 on the side of the substrate 21 opposite to the side of the record layer 20 onto which the light La and Lb for recording/reproduction is applied, and thus, recording/reproduction is performed on the optical disk 1. Accordingly, even if the stabilization guide member 8 slides on the optical disk 1, the record layer 20 is free from being damaged thereby, and, thus, does not occur recording/reproducing error. Moreover, the optical disk 1 usually bends in a manner of convex on the record layer 20 side. This is because the sputter film has compression stress in the record layer 20. For this reason, by applying the stabilization guide member 8 to the optical disk 1 in a manner of pressing from the side of substrate 21, adhering force between the stabilization guide member 8 and optical disk 1 can be effectively stabilized, and, thereby, the surface vibration on the optical disk 1 can be effectively eliminated.

Moreover, the light La and Lb for recording/reproduction is applied directly onto the opposite side of the optical disk 1 from the side onto which the surface vibration stabilization function is applied by the stabilization guide member 8. Accordingly, even when the optical disk 1 is damaged as a result of the stabilization guide member 8 touching the optical disk 1, this damage does not reach the record layer 20 and thus, does not cause recording/reproducing error. Further, since the light La and Lb for recording/reproducing does not pass through the substrate 21, the light La and Lb are free from influence of damage of the substrate 21 and also are free from optical property of the substrate 21. Therefore, the substrate 21 may be opaque.

Figure 4:
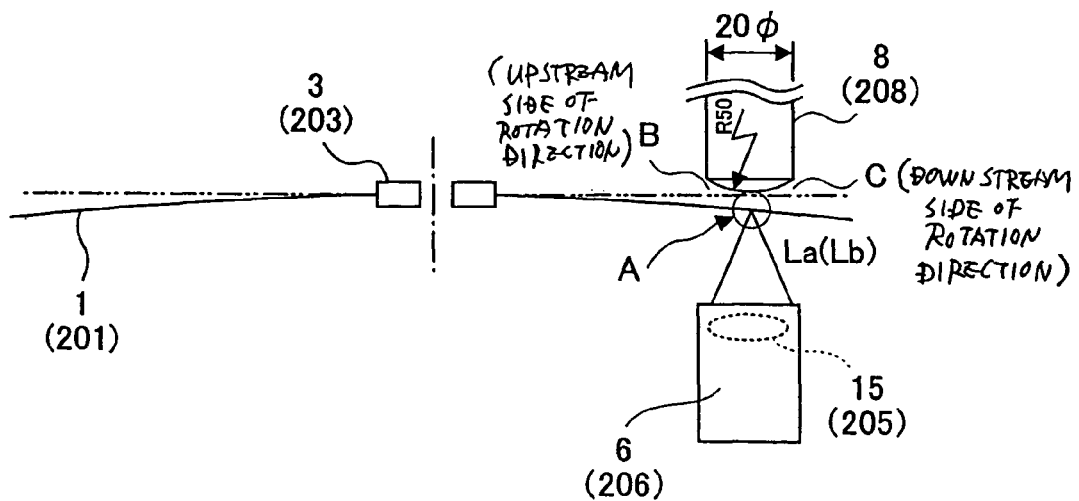
FIG. 4 illustrates a stabilization effect on surface vibration of the optical disk according to the first embodiment of the present invention.

With reference to FIG. 4, further specific description will now be made. In the configuration shown in FIG. 4, a setting should be made such that, other than the stabilization guide member 8, parts/components/members of the optical disk drive, device body, or a disk cartridge in case the disk 1 is contained in the cartridge, are apart from the optical disk 1 more than 1 mm so that these parts/components/members are prevented from causing action according to Bernoulli's law. However, since the operation distance is short in case the object lens 15 has high NA, exceptionally, the object lens 15 approaches to the distance on the order of 0.05 mm through 0.3 mm.

Figure 5:
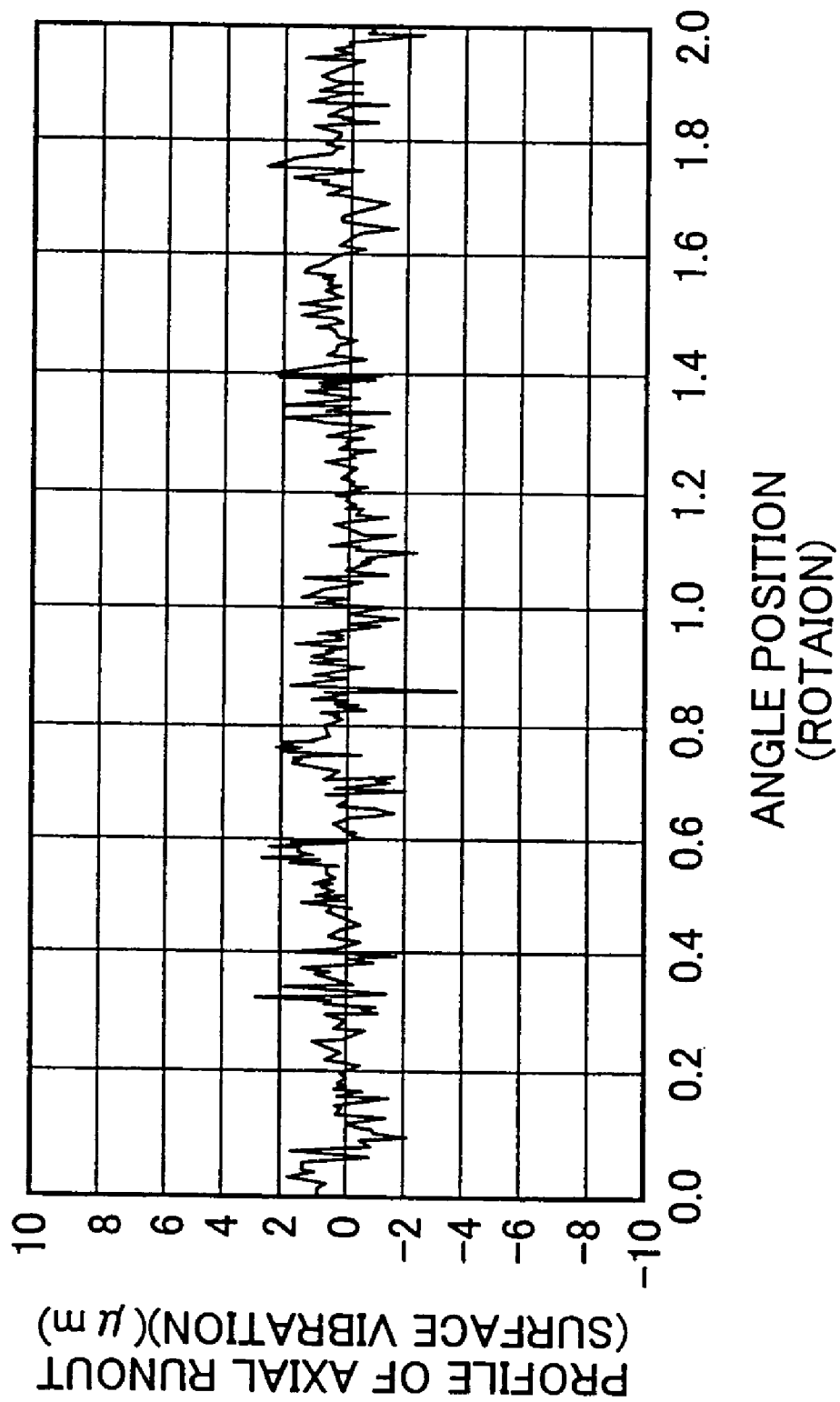
FIG. 5 illustrates a measurement result on surface vibration in the configuration shown in FIG. 4.

Furthermore, FIG. 5 shows an experimental result of measurement of actual surface vibration of the optical disk in the configuration of FIG. 4 for two rotations. In this experiment, the stabilization guide member 8 has the curvature radius of 50 mm at the tip thereof and the diameter of 20 mm. The optical disk 1 has a slot for tracking of 0.65-micrometer pitch formed into a 80-micrometer PET (polyethylene telefthalate) sheet; the record film formed thereon through sputtering, and has the diameter of 120 mm, was rotated at 2000 rpm. The surface vibration was measured by a laser displacement measurement unit. The set distance between the stabilization guide member 8 and the optical disk 1 was approximately 5 micrometers. There was no unusual vibration in the member 8 and any sliding crack was not generated in the optical disk 1. Accordingly, it can be seen that neither excess floating nor sliding occurred. Further, disk surface vibration measured was approximately 3 micrometers, and it can be seen that it is very small, considering that a usual rigid disk produces surface vibration of 50 micrometers or more.

Furthermore, Table 1 summarizes an experimental result on surface vibration which was made through ten revolutions of the same conditions described with reference to FIG. 5, and comparison was made between the present embodiment and related art in which a stabilization guide member is provided for the entire surface of the disk:

TABLE 1

| TYPE OF STABILIZATION GUIDE MEMBER | WIDTH OF SURFACE VIBRATION (MICROMETERS) | VARIATION OF SURFACE VIBRATION ($3\sigma$, MICROMETERS) |
|---|---|---|
| FIRST EMBODIMENT | 11 | 2 |
| RELATED ART | 20 | 6 |

As can be seen from the Table 1, according to the present embodiment, satisfactory performance of stabilization from surface vibration was obtained.

Figure 11:
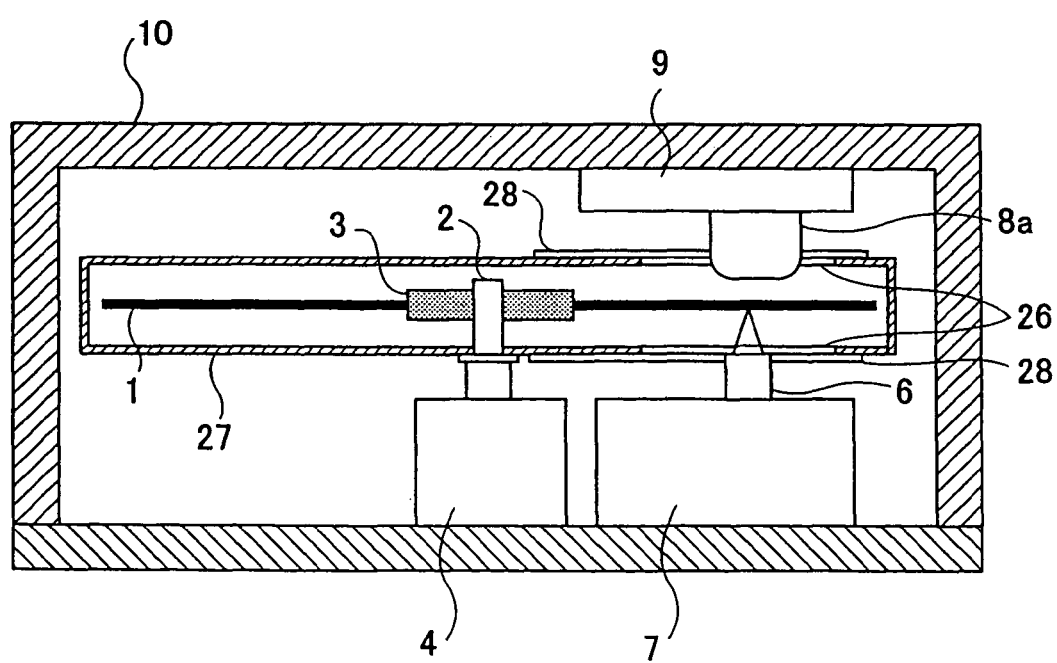
FIG. 11 shows a side-elevational sectional view of an optical information recording/reproducing device in a second embodiment of the present invention.
Figure 12:
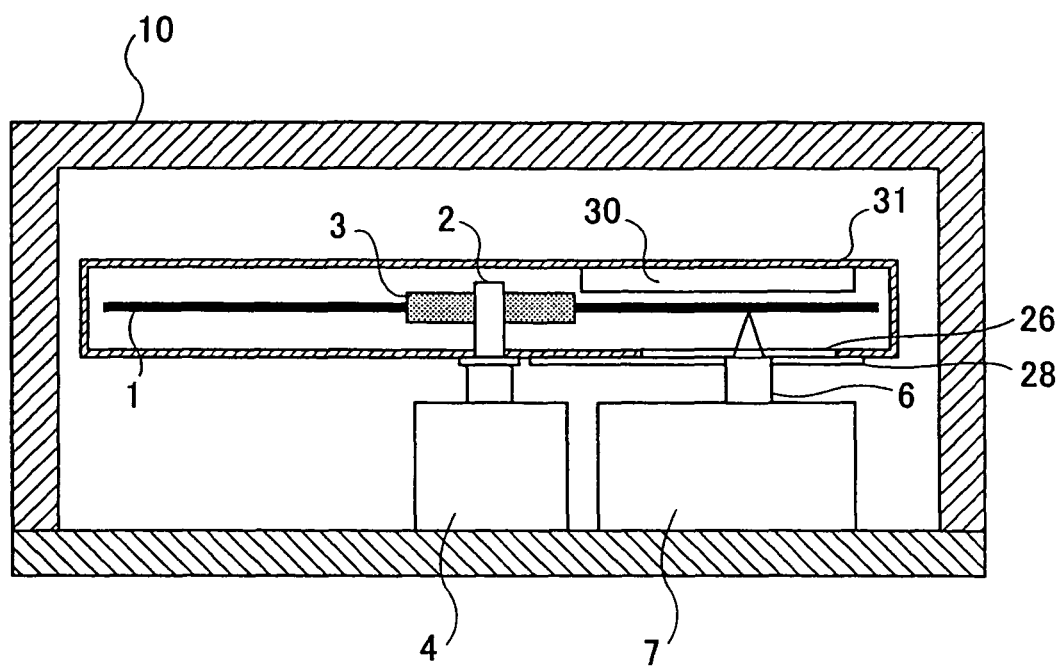
FIG. 12 shows a side-elevational sectional view of an optical information recording/reproducing device in a third embodiment of the present invention.

Such satisfactory stabilization performance from surface vibration is obtained either in case where the stabilization guide member 8 is provided in the device body (see FIG. 1 or 11) or in case where the same member is provided in the disk cartridge (see FIG. 12).

Further, experimentally, recording/reproducing was performed in condition where the disk drive has the wavelength of 405 nm, and the optical pickup has the NA of 0.9. In example, the record position on the optical disk was at the radius of 45 mm, and the shortest record bit length was 0.12 micrometers, and random digital data was modulated according to 1-7RLL and was recorded there.

Further, record line speed was 10 m/s, and three-level modulation was applied such that record peak power was 5 mW, erase power was 2.6 mW and record bottom power was 0.1 mW. Then, the resulting jitter between the basic clock signal and record signal was less than 8%. Further, no particular turbulence on envelope of the record signal occurred, and, also, stable focus and tracking servo control was performed. Although residual error on focus occurred in either recording or reproducing, the defocus value fell within ±0.12 micrometers. In 0.8 or more high NA, the defocus margin is very narrow, i.e., smaller than in case of DVD by a factor of several times. Accordingly, it is necessary to control the defocus amount to fall within ±0.2 micrometers or less. In this meaning, it can be said that sufficient focus stabilization could be achieved according to the first embodiment of the present invention.

Moreover, evaluation was made on defocus amount also for a case where the record line speed was increased into 20 m/s. Also in this case, the defocus amount fell within ±0.12 micrometers or less. On the conventional high rigidity disk, when line speed is increased, surface vibration increases due to resonance phenomenon or so, and, thus, defocus amount also increases. In contrast thereto, according to the first embodiment of the present invention, as mentioned above, superior result was obtained. This is because stabilization from surface vibration is achieved by air force according to the embodiment of the present invention, and, thus, stabilization effect increases as the record line speed increases.

Figure 6:
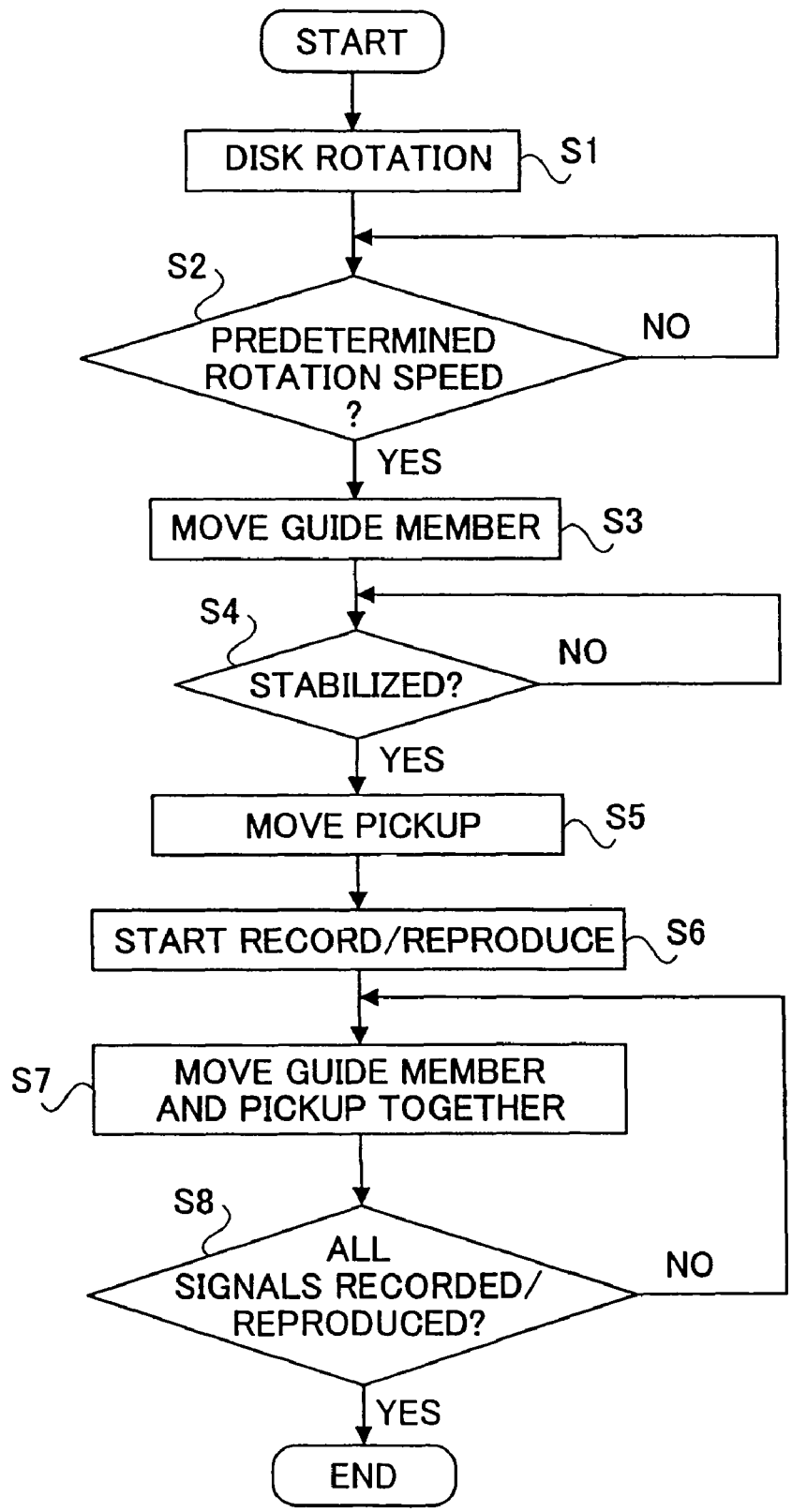
FIG. 6 shows a flow chart of recording/reproducing operation in the recording/reproducing device shown in FIG. 1.

In the present embodiment, in order to obtain the air force stabilization effect effectively, it is necessary to take into consideration the timing of operation on each component. Operation at a time of the recording/reproduction according to the present embodiment will now be described with reference to a flow chart shown in FIG. 6.

Namely, the spindle motor 4 starts, rotates the optical disk 1 (in a step S1), which then reaches a predetermined rotation speed, when a start signal is input into a central processing circuit of the device according to the present embodiment not shown (YES in a step S2), and thereby, the stabilization guide member 8 is moved into a predetermined approach position to the optical disk 1 (in a step S3). There, a laser displacement measurement unit or the like is used for measuring surface vibration of the disk 1, and, thereby, when the surface vibration measured falls within a predetermined surface vibration stabilized range (YES of a step S4), the optical pickup 6 is moved to a predetermined approach position with respect to the optical disk 1 (in a step S5), and recording/reproduction is started at this time (in a step S6).

Then, the stabilization guide member 8 is moved by the positioning mechanism 9, while the optical pickup 6 is moved by the positioning mechanism 7, in an interlocking manner. Thus, the optical pickup 6 and stabilization guide member 8 are made to move together along a radius direction of the optical disk 1 so that they face one another at any time via the optical disk 1 (in a step S7). Then, this operation continues until the recording/reproduction on all relevant signals are completed (in a step S8)

Figure 7:
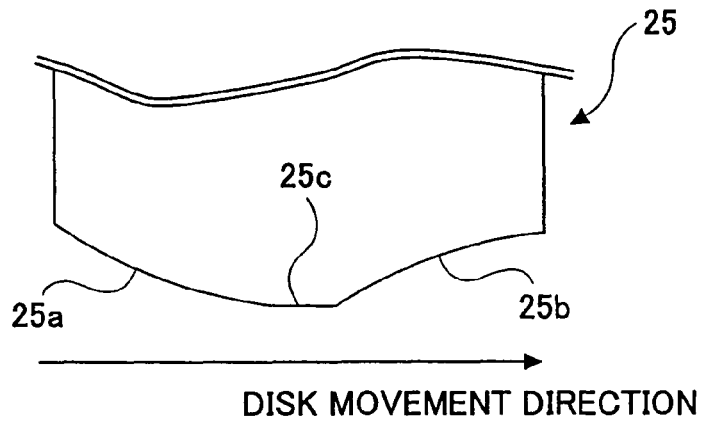
FIG. 7 illustrates a variant embodiment of a stabilization guide member shown in FIG. 4.

Although the configuration shown in FIG. 4 is a basic one, it is possible to further improve the surface vibration stabilization effect by configuring the stabilization guide member 8 as shown in FIG. 7. In the configuration shown in FIG. 7, a side from which the optical disk 1 moves is set as a positive pressure generating part 25a having a convex form in the stabilization guide member 25. Thereby, air is compressed between the positive pressure generation part 25a and optical disk 1, and, thus, repulsive force occurs therebetween. Furthermore, a side toward which the optical disk 1 moves is set as a negative pressure generating part 25b having a concave shape conversely. Thereby, the air which flows by this negative pressure generating part 25b expands rapidly and thus, a negative pressure occurs as compared with the atmospheric pressure, and, thus, attraction force occurs between the stabilization guide member 25 and optical disk 1.

Thus, simply through balance between the repulsive force and attracting force thus generated according to Bernoulli's law due to difference in air pressure between the stabilization guide member 25 and optical disk 1, the surface vibration on the optical disk can be eliminated, and stabilization is achieved.

Furthermore, it is possible to widen the surface vibration stabilized area by providing a flat part 25c between the positive pressure generating part 25a and negative pressure generating part 25b in the stabilization guide member 25, as shown in FIG. 7.

Thus, by the stabilization guide member 8 (25), both the repulsive and attraction forces are generated, and through this action, the distance between the optical disk 1 and stabilization guide member 25 can be stabilized.

Figure 8:
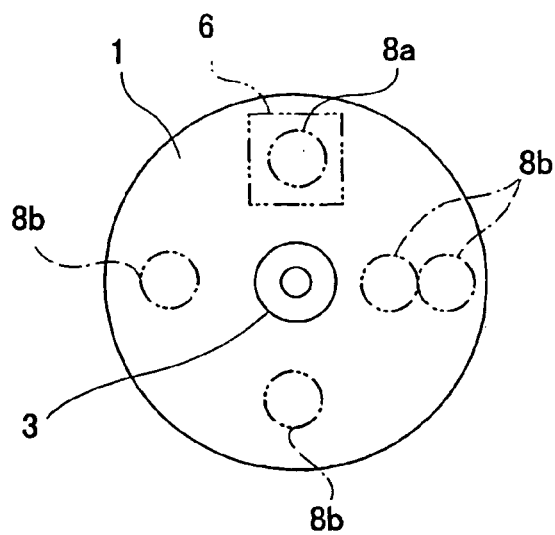
FIG. 8 illustrates an example of disposition of the stabilization guide members in the first embodiment of the present invention.

In addition, the stabilization guide member 8 (25) may be set up suitable to the particular design/specification of the optical disk 1 or the drive device, and a surface vibration stable state on the optical disk 1 adapted therefor can be set, by providing the stabilization guide members 8 at a plurality of positions each facing the optical disk 1 along the circumferential direction of the disk 1, as shown in FIG. 8.

According to the present embodiment, the optical disk 1 must have flexibility softly inevitably since eliminating the surface vibration or tilt is achieved by the air force. As a result, on areas for which no stabilization guide member is provided, the optical disk 1 may then have large surface vibration compared with a case of applying a normal disk material as in a CD, and the surface vibration on the order of 0.5 mm is easily generated there. Depending on each particular case, it is difficult to cause this surface vibration to fall within 5 micrometers or less by the stabilization guide member neighboring the optical pickup 6 within a very short time period.

Figure 9:
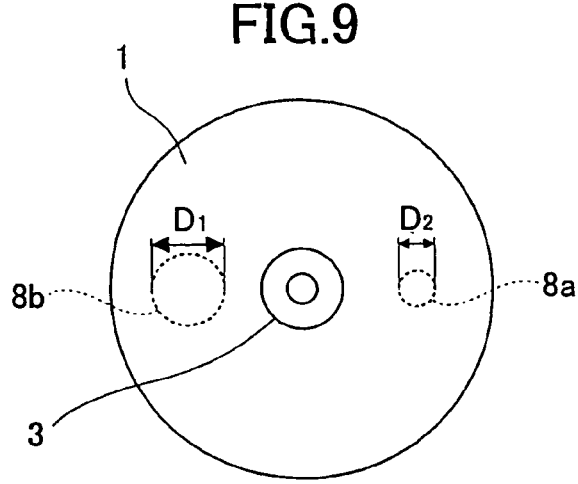
FIG. 9 illustrates another example of disposition of the stabilization guide members in the first embodiment of the present invention.
Figure 10:
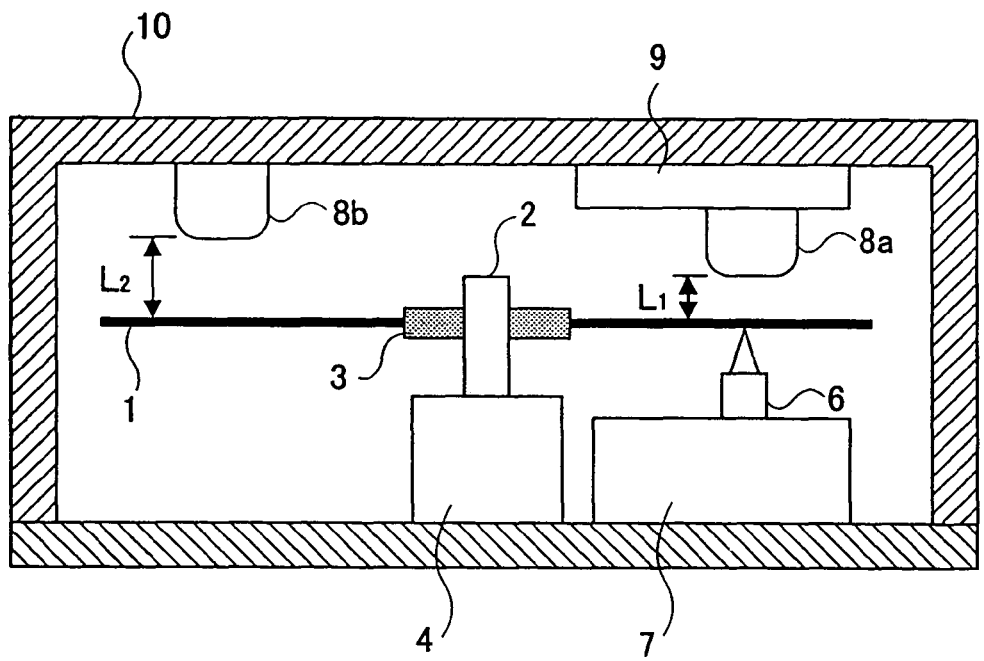
FIG. 10 illustrates another example of disposition of the stabilization guide members in the first embodiment of the present invention.

Then, in the present embodiment, as shown in FIGS. 8 through 10, the margin of the disk drive device system design can be improved by further providing a plurality of stabilization guide members 8b along the circumferential direction of the optical pickup 6, but apart from the neighborhood of the optical pickup 6. Thereby, while roughly stabilizing the entire disk 1 by means of these additional stabilization guide members 8b, further stabilization is performed on a main area (near the optical pickup 6) by means of the main stabilization guide member 8a, as shown in FIG. 8.

As shown in FIG. 8, for example, the (main) stabilization guide member 8a is provided so as to face the optical pickup 6, while the (sub) stabilization guide members 8b are provided apart from the optical pickup 6 for rough stabilization. On these sub-stabilization members 8b, since what is necessary is just to eliminate large surface vibration on the order of 0.5 mm, a merely simple convex spherical shape should be provided thereon. Rather, for these sub-stabilization guide members 8b, it is required to prevent sliding on the disk surface. This is because it is more desirable not to cause an unnecessary vibration by sliding. For this reason, the sub-stabilization guide members 8b should preferably have large sizes in comparison to the main stabilization guide member 8a so as to generate larger floating force.

For example, as shown in FIG. 9, the main stabilization guide member 8a has a pillar shape of a diameter D (=approximately 10 mm) while the sub-stabilization guide member 8b has a pillar shape of a diameter D of 20 mm. Thereby, the sub-stabilization guide member 8b generates larger floating force. In fact, in case the projecting end of the stabilization guide member 8 has a spherical shape, the floating force applied onto the disk 1 thereby becomes larger as the area of the guide member 8 facing the disk surface becomes larger.

Alternatively, or in addition, as shown in FIG. 10, the distances L1 and L2 of the main and sub-stabilization guide members 8a and 8b from a disk reference setting plane (horizontal plane crossing a chucking position between the hub 3 of the optical disk 1 and spindle shaft 2) are set such that L2>L1. Thereby, it is possible to effectively reduce the possibility of the sub-stabilization guide member 8b contacting/colliding the disk surface of the disk 1.

The positions and number of these sub-stabilization guide members may be appropriately determined according to a particular design of the disk drive device applied.

According to the first embodiment of the present invention, the stabilization guide member 8 and the positioning mechanism 9 therefor are provided in the upper part in the main part 10 of the disk drive device, as shown in FIG. 1. Therefore, a user can deal with the optical disk 1 in the state of nakedness without a cartridge. In this case, the optical disk 1 can be made as a low-cost optical information recording medium. In fact, in the present embodiment, the optical disk 1 has a sheet structure, and, is handled by putting in an envelope or so, and, in case of loading it in the drive device, a user picks up it therefrom and set it onto the spindle shaft 2

FIG. 11 shows a side-elevational sectional view of an optical information recording/reproducing device in a second embodiment of the present invention. In this configuration, the sheet of optical disk 1 is contained in a disk cartridge 27 having opening windows 26 and 26, this disk cartridge 27 is inserted into a predetermined position in the recording/reproducing device, shutters 28 and 28 are then opened by an operation unit not shown, the stabilization guide member 8 and optical pickup 6 are moved so that this member 8 and the optical pickup 6 are inserted therethrough, and, thus, a state in which recording/reproduction is possible is created, as shown in FIG. 11.

As the disk cartridge 27, a common configuration can be employed, and, thus, it can be provided with a very low cost rise if any.

Figure 13:
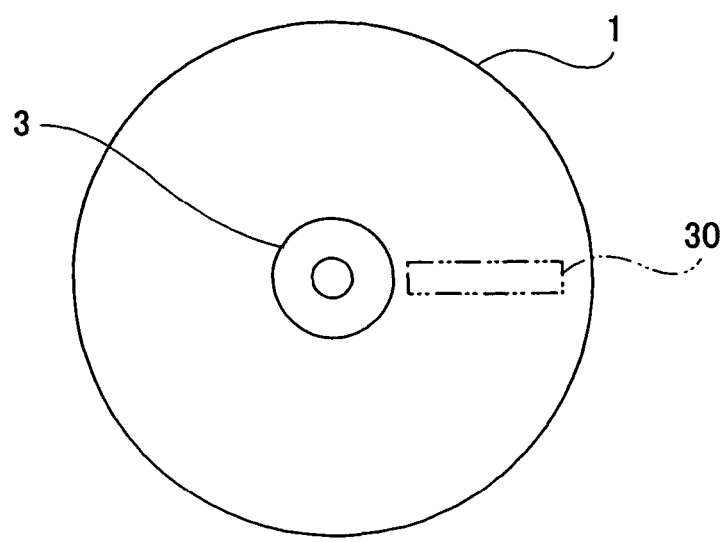
FIG. 13 illustrates a plan view showing a shape and position of the stabilization guide member shown in FIG. 12.

FIG. 12 shows a side-elevational sectional view of an optical information recording/reproducing device in a third embodiment of the present invention. In this configuration, the stabilization guide member 30 is provided in the inside of the disk cartridge 31. As shown in FIG. 13, the stabilization guide member 30 has an oblong form long along a radius direction of the optical disk 1, and no positioning mechanism 9 is needed different from the first and second embodiments. This stabilization guide member 30 provides the surface vibration stabilization effect on the optical disk 1 as in the above-described first embodiment of the present invention. The stabilization guide member 30 is positioned so that an area on which the surface vibration stabilization effect functions is located at a position at which the optical pickup 6 applies the laser beam (recording/reproducing light).

Also in the third embodiment, a shutter 28 is moved by an operation unit not shown, so that the optical pickup 6 may be inserted through an opening window 26 opened widely thereby, and, thus, a state in which recording/reproduction is possible is created, as shown in FIG. 12.

According to the third embodiment, as the stabilization guide member 30 is built in the disk cartridge 30, the entire configuration of the recording/reproducing device can be made same as the conventional device for applying an optical disk of a rigid substrate. Thereby, it becomes easy to take compatibility with a disk drive system of the optical disk using such a rigid substrate.

Figure 14:
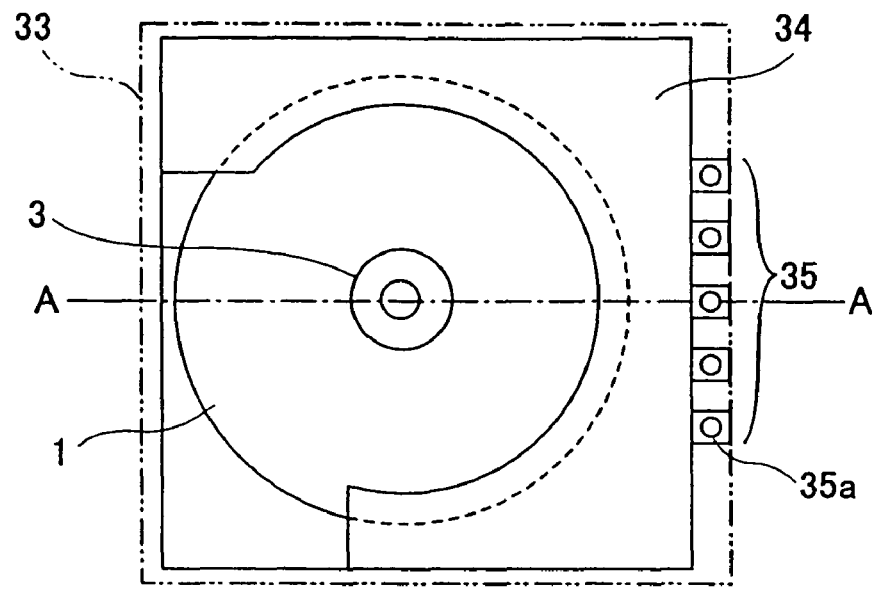
FIG. 14 illustrates a disk cartridge in a fourth embodiment of the present invention.
Figure 15:
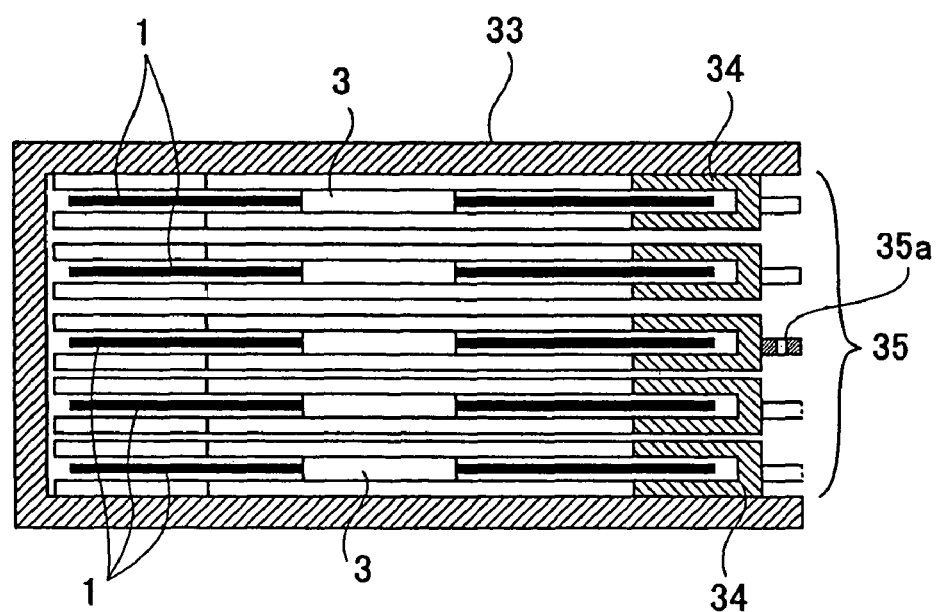
FIG. 15 shows a side-elevational sectional view of the disk cartridge shown in FIG. 14.
Figure 16A:
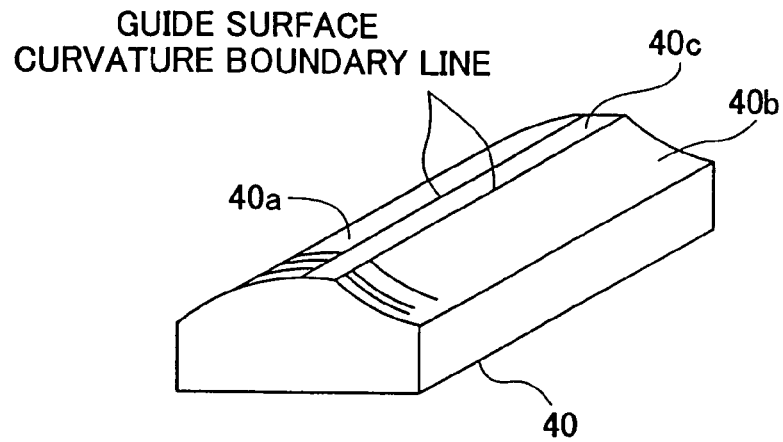
FIGS. 16A, 16B, 17, 18A, 18B, 19, 20 and 21 illustrate various examples of specific configurations of the stabilization guide members according to the present invention.
Figure 16B:
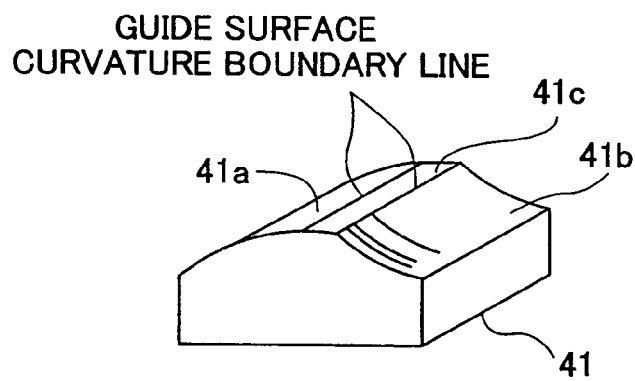

FIG. 14 shows a plan view of a disk cartridge in a fourteenth embodiment of the present invention and FIG. 15 shows a side-elevational sectional view thereof taken along an A-A line shown in FIG. 14. This disk cartridge may be applied to an optical recording/reproducing device same as the first embodiment described above.

As shown in FIG. 14 and FIG. 15, in the disk cartridge 33, a plurality of optical disks 1 each of the shape of a sheet which has flexibility can be held, and has a configuration which can be used with an automatic disk replacement mechanism. In this configuration, as the number of sheets of the optical disks 1 is increased, the storage capacity usable can be thus increased accordingly. According to the first embodiment of the present invention, as the stabilization guide member is provided in the recording/reproducing device for eliminating/stabilizing the surface vibration of the optical disk 1 at a portion thereof on which a laser beam from the optical pickup 6 is applied, it is possible to reduce the thickness of the optical disk 1. Accordingly, even when the number of optical disks 1 held by the disk cartridge 33 increases, the whole disk cartridge 33 volume does not become much larger.

The disk cartridge 33 of the present embodiment has a configuration such that the end part of each optical disk 1 is inserted into a disk tray 34 for holding the optical disk 1 therewith, and the automatic disk replacement operation is performed by taking the disk tray 34 in and out of the record/reproducing device.

In order to identify and take out a specific optical disk 1 from among the plurality of disks 1, each disk tray 35 has an identification part 35 at a position different from each other. Thereby, these different positions are detected by the automatic disk replacement mechanism provided on the recording/reproducing device, and, thus, a desired optical disk 1 can be taken out from the disk cartridge 33, and is loaded into the recording/reproducing device.

Specifically, as each disk 1 is thin, and intervals between the respective disks 1 are narrow, it may be difficult for the automatic disk replacement mechanism to identify particular disks. Accordingly, in the fourth embodiment, as shown in FIG. 14, the disk identification parts 35 are arranged 'laterally'. Then, an arm of the disk replacement mechanism (not shown) is configured such as to be inserted into a hole formed in each identification part 35, and is taken out. As the lateral length of the disk cartridge 33 is relatively large, the identification can be easily made.

According to the fourth embodiment, the disk cartridge 33 has a configuration such that simply the disk trays 34 are placed on each other, and, thus, has a simple configuration. Furthermore it is possible to provide a disk cartridge having a large information storage capacity by a small size. Further, as the flexible disks 1 each being thin, having low rigidity and, thus, hard to handle alone, are held by the cartridge 33, they can be easily handled by a user.

Although description has been made on the rewritten type optical disk which employs the phase-change record layer, the present invention described above may also be applied to another type of disk recording medium. In fact, according to the present invention described above, a configuration of a guide member for effectively eliminating/stabilizing surface vibration of a disk recording medium and improving recording accuracy thereon is provided, and also, application of this configuration to a recording/reproducing device can be made. For example, the present invention may be applied to a reproducible optical disk using embossing pits, an optical magnetism type or magneto-optical record disk, and another any type of disk recording medium for which recording/reproducing is performed through a laser beam applied thereto.

Moreover, on the stabilization guide member according to the present invention, various forms and structures can be considered, for example, as shown in FIGS. 16A through 21. Each of the stabilization guide members 40 and 41 shown in FIGS. 16A and 16B has a configuration same as that described above with reference to FIG. 7, and includes a first guide surface 40a/41a of a convex form; a second guide surface 40b/41b having a concave from; and a flat surface 40c/41c. The stabilization guide member 40 shown in FIG. 16A extends along a line along a radius direction of the optical disk 1 along which the optical pickup 6 moves. The stabilization guide member 41 shown in FIG. 16B is movable along the line along the radius direction of the optical disk 1 along which the optical pickup 6 moves.

In each of the stabilization guide members 40 and 41, the flat surface 40c/41c may be omitted, and, thus, only the first and second guide surfaces 40a/41a and 40b/41b may be provided adjacently.

Figure 17:
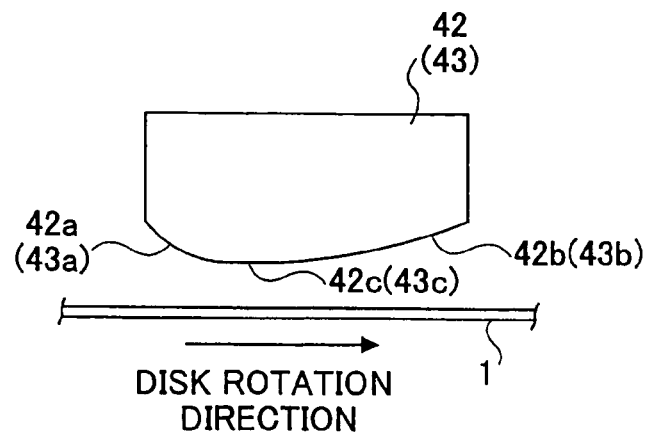
Figure 18A:
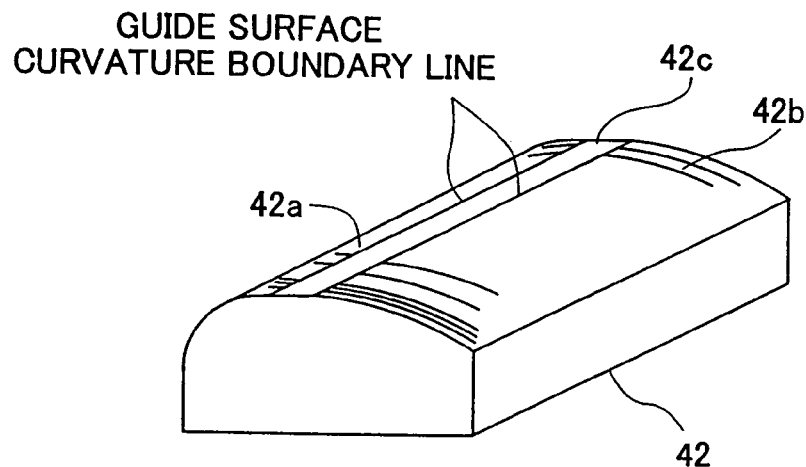
Figure 18B:
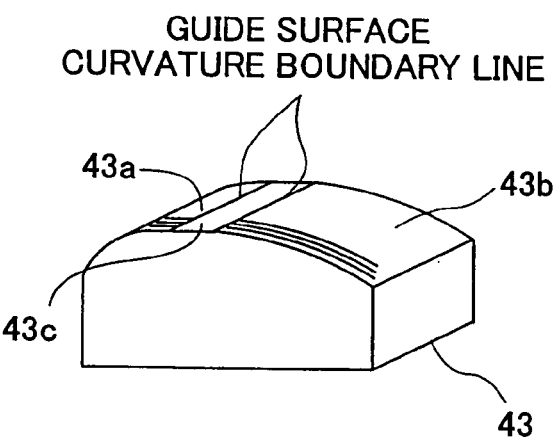

Each of the stabilization guide members 42 and 43 shown in FIG. 17 and FIGS. 18A, 18B has a surface formation including, in the order from the upstream side of disk rotation direction, a first guide surface 42a/43a of a convex form, a flat surface 42c/43c, and a second guide surface 42b/43b of also a convex form. The stabilization guide member 42 shown in FIG. 18A extends along a line along a radius direction of the optical disk 1 along which the optical pickup 6 moves. The stabilization guide member 43 shown in FIG. 18B is movable along the line along the radius direction of the optical disk 1 along which the optical pickup 6 moves.

In each of the stabilization guide members 42 and 43, the flat surface 42c/43c may be omitted, and, thus, only the first and second guide surfaces 42a/43a and 42b/43b may be provided adjacently.

Figure 19:
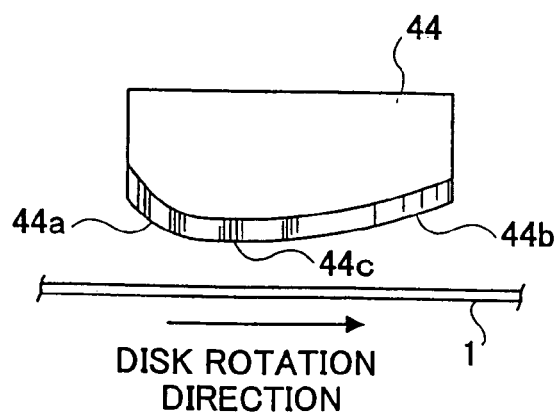
Figure 20:
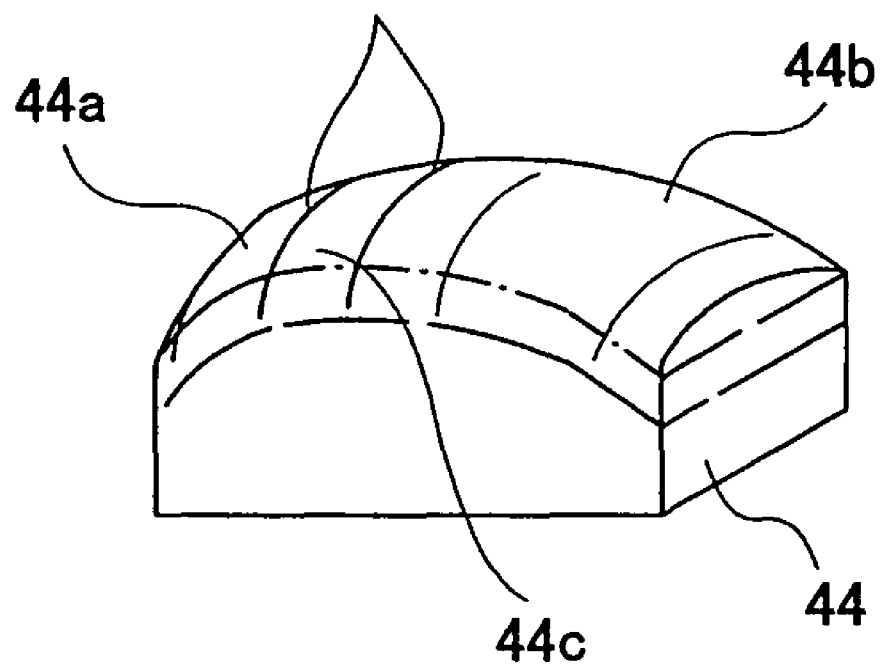

The stabilization guide member 44 shown in FIGS. 19 and 20 has a surface formation including, in the order from the upstream side of disk rotation direction, a first guide surface 44a having a convex form and a curved surface along a direction perpendicular to the disk rotation direction, a flat surface 44c having a curved surface along the direction perpendicular to the disk rotation direction, and a second guide surface 44b of also a convex form and having a curved surface along the direction perpendicular to the disk rotation direction. The stabilization guide member 44 is provided movably along the line along the radius direction of the optical disk 1 along which the optical pickup 6 moves.

In the stabilization guide member 44, the flat surface 44c may be omitted, and, thus, only the first and second guide surfaces 44a and 44b may be provided adjacently.

Figure 21:
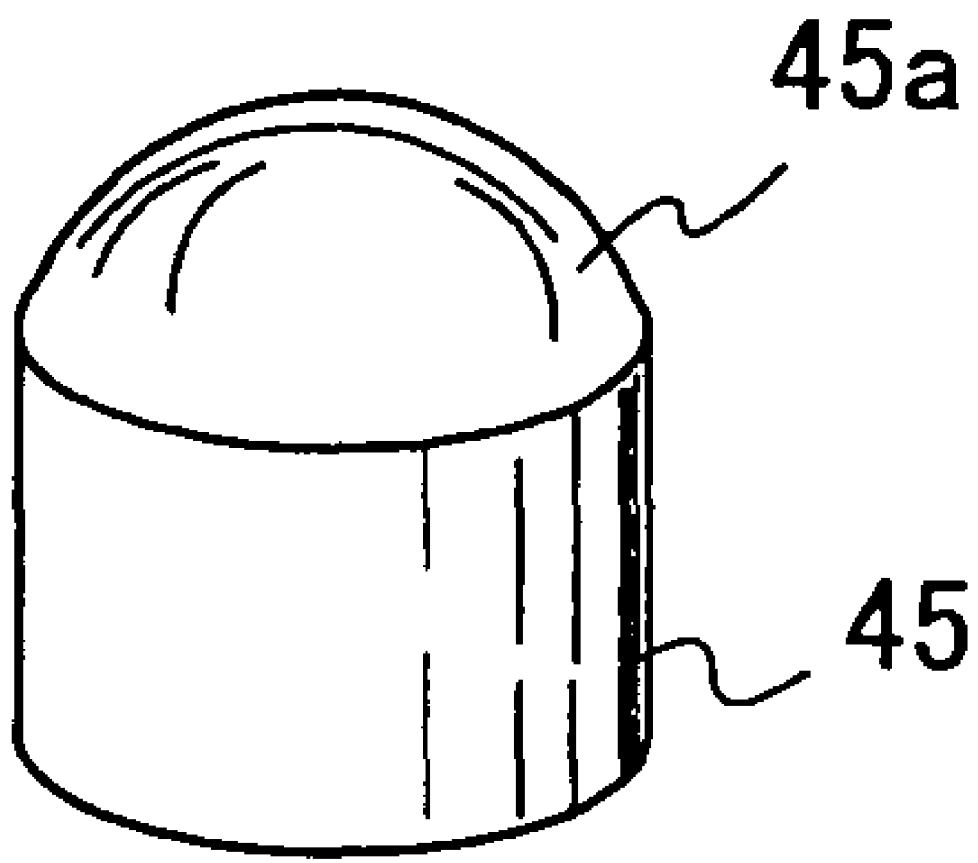

The stabilization guide member 45 shown in FIG. 21 has a basically pillar-like shape and, same as that shown in FIG. 4, has a surface formation of a curved surface 45a at an end facing the optical disk 1.

In each configuration, as the surface of the stabilization guide member thus has an arc-shaped, the Bernoulli's effect can be smoothly created with the disk surface.

Thus, according to the first through fourth embodiments of the present invention, the stabilization guide member has a configuration such as to perform the following functions on the flexible disk being rotated: That is, on the upstream side along the disk rotation direction, the stabilization guide member generates a positive pressure, thereby, repulsive force being generated between the flexible disk and stabilization guide member. As a result, the flexible disk floats from the stabilization guide member. In contrast thereto, on the downstream side along the disk rotation direction, the stabilization guide member generates a negative pressure, thereby, attraction force being generated between the flexible disk and stabilization guide member. However, as the flexible disk has a somewhat rigidity, it does not come into contact with the stabilization guide member but merely somewhat approaches the stabilization guide member.

Thus, the flexible disk is subjected to the repulsive force and after that, is subjected to the attraction force from the stabilization guide member. Accordingly, the flexible disk rotates while the flexible disk has a fixed distance with the stabilization guide member stably at a position at which the stabilization guide member faces the flexible disk. Accordingly, by applying a laser beam at the position of the flexible disk for performing recording/reproducing, it is possible to perform recording/reproducing in a condition free from or with effectively reduced surface vibration and tilt of the flexible disk.

Thus, by employing the air force to perform surface vibration elimination/stabilization, and also, by configuring the flexible disk having a low rigidity, it is possible to create stable recording/reproducing conditions without problematic surface vibration, without needing to configure the flexible disk at high accuracy. Accordingly, the recording/reproducing pickup should not have a performance of coping with large surface vibration of the flexible disk, thus, the defocus amount is reduced, and high-density recording can be achieved.

Furthermore, thereby, the object-lens actuator of this pickup should not cope with a large amplitude, low frequency movement, and instead, should have a high-rigidity elastic member (spring) for supporting the actuator. Thereby, the pickup has a high-band resolution at a high-frequency band, and, thus, it can well control defocus even in case of high-line-speed recording/reproducing.

Furthermore, the escape portions are provided in the flexible disk in which the above-mentioned air force according to Bernoulli's law is not applied on the upstream and downstream sides of position at which the air force is applied for eliminating surface vibration so as to stabilize. Thus while the flexible disk is forcibly deformed by the stabilization guide member so as to create the portion of the flexible disk at which the flexible disk falls in a stable condition, it is possible to effectively reduce repulsive force at the stabilized portion there by providing the escape portions at which the flexible disk is allowed to be unstable instead.

In contrast thereto, according to the related art, a stabilization plate is provided so as to face the entire surface of a flexible disk. However, according to such a device, when the flexible disk bends, bending force strongly functions from the upstream and downstream sides, and, thereby, it may be difficult to create a stabilized condition at a portion at which a laser beam for recording/reproducing is applied.

Furthermore, on a type of optical disk on which a record layer is formed on a flexible substrate, the substrate is likely to curve toward the direction opposite to the layer formed side. Then, by providing the stabilization guide member according to the present invention on the side opposite to the record layer formed side, the stabilization effect effectively functions by the restoration force of the substrate itself and the repulsive force from the stabilization guide member. For this reason, according to the above-mentioned embodiments of the present invention, the stabilization guide member is disposed on the side opposite to the record layer formed side, i.e., the substrate side of the optical disk, while the optical pickup is disposed on the record layer formed side. Accordingly, even when the optical disk is damaged as a result of the stabilization guide member touching the optical disk, this damage does not reach the record layer and thus, does not cause recording/reproducing error. Further, since the laser beam for recording/reproducing does not pass through the substrate, the laser beam is free from influence of damage of the substrate and also are free from optical property of the substrate.

Furthermore, the present invention described above may be applied to a disk drive device having single recording function, or a disk drive device having a single reproducing function, or any other drive device handling a flexible disk.

A fifth embodiment of the present invention will now be described.

Figure 22:
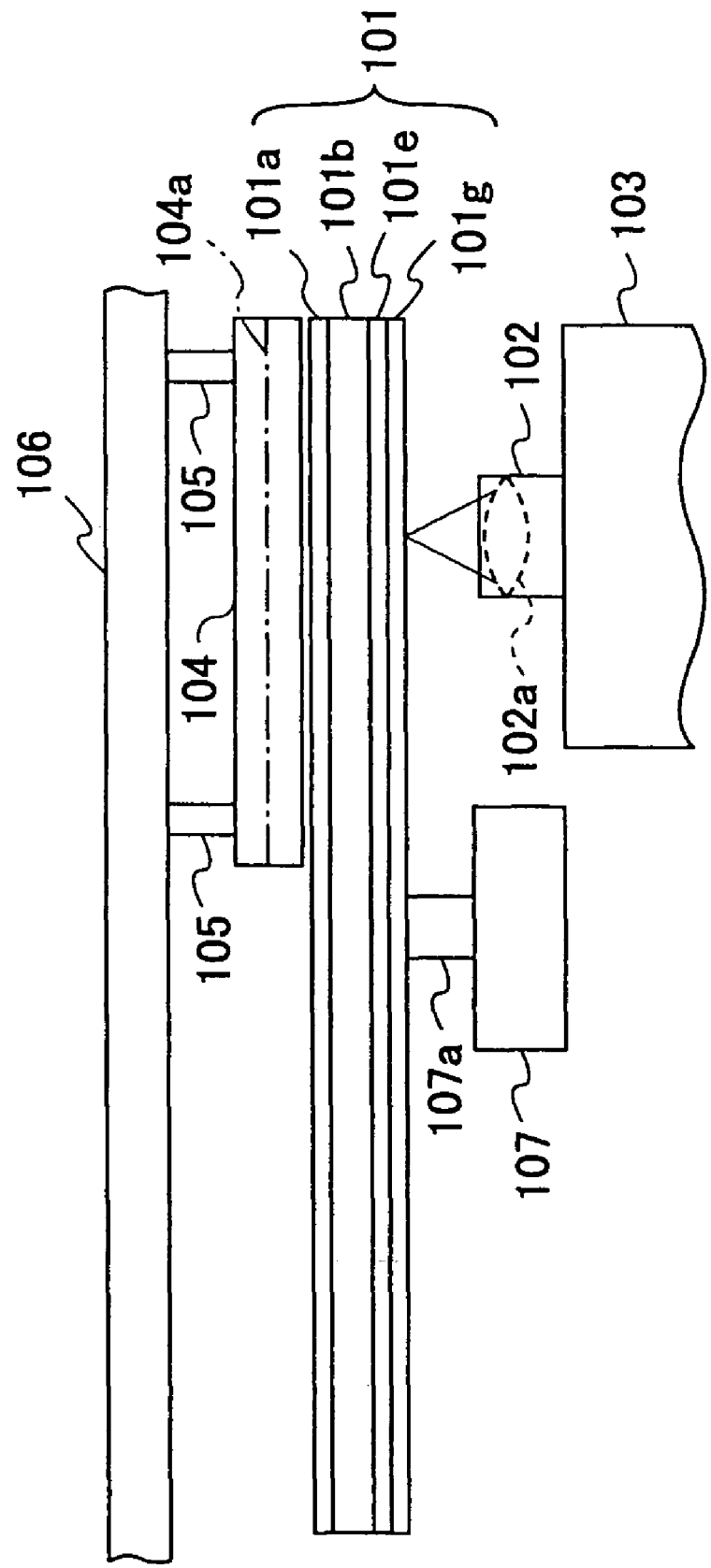
FIG. 22 shows a side elevational view of an information recording/reproducing device in a fifth embodiment of the present invention.
Figure 23:
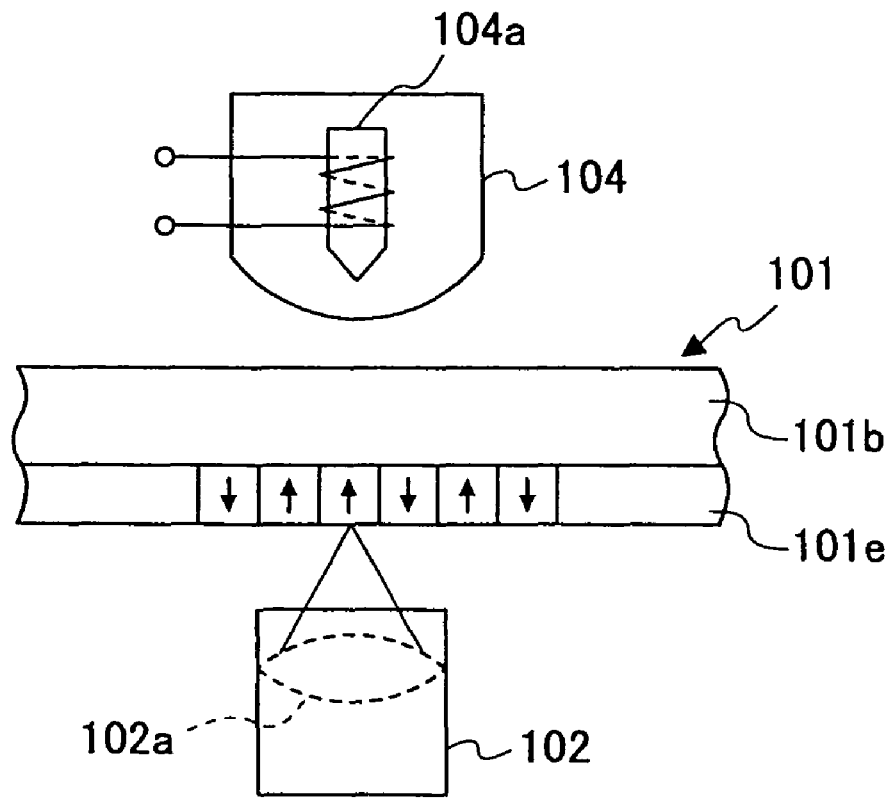
FIG. 23 shows a side elevational view around a guide member shown in FIG. 22.
Figure 24:
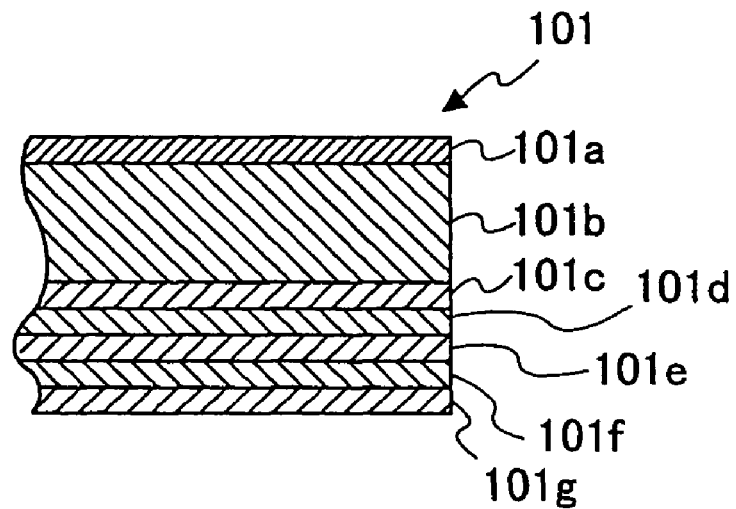
FIG. 24 shows a side elevational sectional view of an flexible optical disk applied to the device shown in FIG. 22.

FIG. 22 shows an outline configuration view of an information recording/reproducing device in the fifth embodiment of the present invention; FIG. 23 shows an outline in the neighborhood of a guide member 104 viewed from a radius direction of an optical disk 101 of the recording/reproducing device shown in FIG. 22; and FIG. 24 shows an example of a sectional view of the sheet-like record disk 101 which has a flexibility on which recording/reproduction is performed by the information recording/reproducing device shown in FIG. 22. For the purpose of convenience in illustration, the thickness of the sheet-like record disk is magnified more than an actual size in FIGS. 22 through 24.

In the information recording/reproducing device which is an optical recording/reproducing device shown in FIG. 22, a spindle 107a holding a hub (not shown) of the sheet-like record disk 101 which is a disk-like recording medium which has flexibility; a spindle motor 107 performing rotation drive of the spindle 107a; on a side of the sheet-like record disk 101, an optical pickup 102 which is an optical head mechanism which is arranged in this embodiment at the bottom thereof, condenses a laser beam onto a TbFeCo magneto-optical recording layer 101e which is provided on a record side of the sheet-like record disk 101, and carries out recording/reproduction operation.

A move rail 103 supports the optical pickup 102, and the guide member 104 is arranged with in the present embodiment at the bottom thereof, and controls positional deviation such as the above-mentioned surface vibration of the sheet-like record disk 101 on the other side of the sheet-like record disk 101. A guide actuator 105 is a mechanism of adjusting a projection amount of the guide member 104 with respect to the sheet-like record disk 101.

The hub fixed onto the sheet-like record disk 101 for chucking is omitted from the figures.

The above-mentioned guide actuator 105 is attached in a chassis 106. Although a piezo-actuator is employed as the guide actuator 105 in the present embodiment, instead thereof, an electromagnetic actuator such as a linear motor may be employed.

As shown in FIG. 23, in using the magneto-optical sheet-like record disk 101 as in the present embodiment, the (stabilization) guide member 104 includes an electromagnet 104a for making a magnetic field at a time of information recording/erasing operation. This electromagnet 104a can reverse the N/S pole of the TbFeCo magneto-optical recording layer 101e, according to recording/erasing operation.

As shown in FIG. 24, as the above-mentioned sheet-like record disk 101 in the fifth embodiment, a magneto-optical sheet-like record disk is used. The sectional structure of this sheet-like record disk 101 includes a sliding-protection film 101a such as DLC (diamond-like carbon) of 200 nm thickness formed on one side of a base member 10b; an Ag reflective layer 101c formed on the other side of the base member 101b; a SiNx protection layer 101d formed on the Ag reflective layer 101c; a TbFeCo magneto-optical record layer 101e formed on the SiNx protection layer 110d; a SiNx projection layer 101f formed on the TbFeCo magneto-optical record layer 110e; and a transparent protection layer 101g made of an ultraviolet setting resin or the like of 5 micrometers thickness formed on the SiNx protection layer 101f.

The base member 101b is produced by the following process: A sheet of 0.1 mm thickness in a product made from dry photograph polymer is used, then, a stamper having pits and grooves formed thereon is pressed thereon, then, the stamper is removed therefrom, and, after that, ultraviolet ray irradiation is performed. Thus, the pits and grooves are formed thereon. Then, the outer diameter of 120 mm of disk is obtained therefrom, and, then, a hole of inner diameter of 10 mm is formed therein.

The thickness of the base member 101b should be approximately within a range between 0.01 and 1.5 mm, and more preferably, within a range between 0.03 and 0.2 mm. When it is too thick, a proper flexibility cannot be provided, while when it is too thin, the sheet-like record disk 101 may be destroyed due to stress applied in acceleration/deceleration thereof.

The record film is formed on this base member 101b through sputtering. Specifically, the Ag reflective layer 101c is first formed by 50 nm thickness, then, the SiNx protection layer 110d is formed by 8 nm thickness thereon, the TbFeCo magneto-optical recording layer 101e is formed by 15 nm thickness thereon, and the SiNx protection layer 101f is formed by 40 nm thickness thereon. The number 'x' of SiNx may be determined arbitrarily. That is, since a shift may be made from the stoichiometric composition according to the film forming requirements, it is expressed as 'x'.

In case of the magneto-optical medium, since magnetic field is required at a time of recording operation, the electromagnet 104a is provided in the guide member 104. The magneto-optical medium has a signal intensity smaller than that of a phase-change medium, and thus, it is strongly influenced by polarizational noise of a plastic substrate. However, since actual recording/reproduction is carried out without causing laser beam to pass through the base member 101b, such a problem does not occur.

Further, a permanent magnet may be provided in the guide member 104 instead of the electromagnet, a drive mechanism for the permanent magnet may be provided, and thereby, N/S may be reversed. However, in viewpoint of addressing to a simpler structure, providing of the electromagnet 104a is still preferable.

Moreover, it is necessary to reduce the record density because of the smaller signal, since the record speed is very high because of the magnetic record type. For this reason, the magneto-optical recording layer is employed in the fifth embodiment. In fact, as for this type of record layer, the record line speed on 1 m/s or 30 m/s can be achieved. Therefore, it is possible to keep rotating of the sheet-like record disk 101 at more than 15 m/s by which the sheet-like record disk 101 can float by means of air flow occurring thereby.

On the SiNx protection layer 101f, ultraviolet setting resin is coated by spin coating, and, then, is made to set, and, thus, the 5-micrometer transparent protection layer 101g is formed. Finally, the hub for chucking is fixed at the center of the disk, and, thus, the flexible optical disk which is the sheet-like record disk 101 is obtained.

On the side of the sheet-like record disk 1 facing the guide member 104, 20 nm of DLC (diamond-like carbon) is formed by sputtering.

As mentioned above, recording/reproduction operation is not performed by causing the laser beam to pass through the basic member 101b, but recording/reproduction operation is carried out through the transparent protection layer 101g which is ultraviolet setting resin. Therefore, a material opaque can be used as the base member 101b.

The optical recording/reproducing device according to the fifth embodiment of the present invention uses a semiconductor laser with a wavelength of 405 nm not shown, and is of NA of 0.85. The optical pickup 102 condenses the laser beam by an object lens 102a. The distance between the record film of the sheet-like record disk 1 and the object lens 102a is approximately 0.2 mm.

The sheet-like record disk 101 is chucked onto the spindle 107a, and the metal guide member 104 is provided on the side opposite to the side of the object lens 102a with respect to the sheet-like record disk 101. Since the sheet-like record disk 101 is soft, the periphery thereof slightly lowers by gravity. Accordingly, the sheet-like record disk 101 does not touch the guide member 104 immediately after the chucking.

When the sheet-like record disk 101 rotates and regular rotation is reached by driven by the spindle motor, due to the centrifugal force, the disk 101 becomes in general flat and thus, touches the guide member 104. However, they are not completely in contact as air flow generated therebetween due to the rotation of the sheet-like record disk 101. Then, the optical pickup 102 approaches the sheet-like record disk 101, and performs recording/reproduction thereon. When the line speed of the disk 101 with respect to the optical pickup 102 reaches approximately 5 m/s, the disk 101 floats completely from the guide member 104 by the air flow. However, even when rotation speed of the disk 101 does not reach a range causing such air floating, it is possible for the guide member 104 to control the position of the sheet-like record disk 101.

Since the guide member 104 is so long as to extend for a moving range of the optical pickup 2, i.e., has a length more than the radius of the sheet-like record disk 101, the optical pickup 102 and guide member 104 face one another through the disk 101. Since the position along the focus direction of the sheet-like record disk 101 is controlled by the guide member 104, there is almost no surface vibration of the sheet-like record disk 101. Therefore, the moving range of the object lens 102a can be designed smaller. That is, it becomes smaller remarkably from approximately ±0.5 mm into approximately ±0.05 mm. Thereby, an actuator of the object lens 102a may be made to have a lighter weight, and the servo characteristic at a high frequency region can be improved. This contributes to widen the line speed margin of the optical pickup 102 in case of operation at high line speed. The length of the guide member 10 may however be made shorter than the moving range of the optical pickup 102.

Although not shown in the figures, this sheet-like record disk 101 is usually held by a cartridge. When it is inserted into the drive device, the disk 101 is pulled out therefrom, and is chucked onto the spindle.

Moreover, the guide member 104 which controls the position of the sheet-like record disk 101 as mentioned above has a projecting end thereof shaped to be curved so as not to damage the surface of the disk 101 in case of touching. The material of the guide member 104 is Ti alloy. The surface of the guide member 104 is worked so that there is approximately 5-micrometer unevenness. Thereby, sticking of the guide member 104 with the sheet-like record disk 101 is avoided.

As shown in FIG. 23, in the guide member 104, the electromagnet 104a is contained for recording/erasing, as mentioned above. By this electromagnet 104a, N/S can be reversed according to recording/erasing. The guide member 104 is fixed to the chassis 106 through the guide actuators 105 of piezo-actuators, as shows in FIG. 22.

The guide member 104 projects by the guide actuators 105 which are slight movement mechanisms for this guide member 104, and thereby, the projection amount of the guide member 104 is finely adjusted. This adjustment on projection amount is made such that the focus offset on the object lens 102a may become made smaller, i.e., zero.

Moreover, abnormal vibration of the guide member 104 is detected by monitoring of the impedance of these guide actuators 105.

While the rotation speed of the sheet-like record disk 101 is low, vibration caused by sliding of the guide member 104 on the disk 101 occurs. Then, as the rotation speed increases and floating of the disk 101 from the guide member 104 occurs, the amplitude of vibration decreases. When abnormally large vibration is detected, the guide member 104 is caused to be apart from the disk 101 by means of the actuators 105, and, simultaneously, the optical pickup 102 is caused to retreat. Further, the spindle 107a is stopped rotation, and the sheet-like record disk 1 is returned to the cartridge, then, ejection of the cartridge is performed.

The above-mentioned abnormal vibration is vibration occurring in the sheet-like record disk 101 during rotation, due to temperature, humidity, and variation in the substrate thickness etc., and, extremely large abnormal vibration is vibration occurring at an earlier stage of collision between the sheet-like record disk 101 and object lens 102a.

Figure 25:
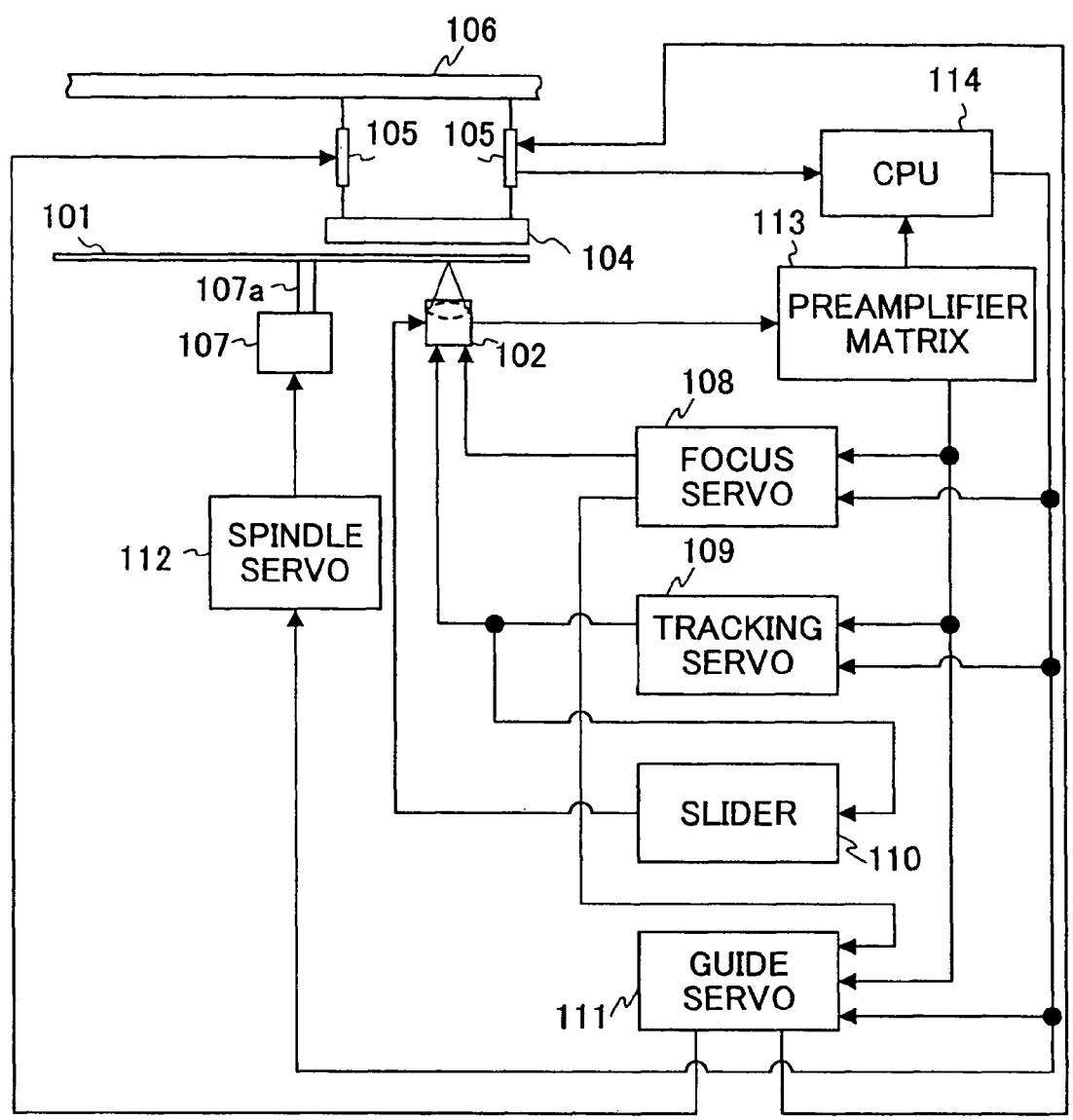
FIG. 25 shows a block diagram of a servo control system except a signal processing system in the device shown in FIG. 22.

FIG. 25 is a block diagram of a servo control system except a signal processing system of the information recording/reproducing device shown in FIG. 22. The servo control system of this information recording/reproducing device is the same as that of a general optical disk drive almost, a portion positioning the guide member 104 on the basis of focus offset, and a portion determining vibration data on the guide member 104 and stopping the operation of the drive device are added according to the present embodiment.

This servo control system includes a focus servo unit 108 which receives a focus error signal, and performs focusing operation for applying the laser beam onto the record surface of the sheet-like record disk 101; a tracking servo unit 109 which receives a tracking error signal and drives a slide motor 110 so that the laser beam may follow the track of the sheet-like record disk 101; a spindle servo unit 112 which controls uniformly the rotation speed or line speed of the sheet-like record disk 101 by PLL control etc.; a guide servo unit 111 which receives the focus error signal and drives the guide member 104 so that the record surface of the sheet-like record disk 101 may enter in the depth of focus of the object lens 102a; a preamplifier matrix 113 which provides the focus error signal to the focus servo unit 108 and guide servo unit 109, and provides the tracking error signal to the tracking servo unit 109; and a CPU 114 which controls the whole device. The movement of the guide member 104 is stopped after a height adjustment thereof is finished during the rotation of the sheet-like record disk 101 basically. Projecting operation of the guide member 104 is performed for eliminating the offset along the focus direction while the servo operation of the focus servo unit 108 performs positional control of the object lens 102a so as to follow dynamic surface vibration of the sheet-like record disk 101.

The above-mentioned focus servo unit 108 acts as a focal servo system with the optical pickup 102, and provides a control signal which drives the optical pickup 102 so that the distance between the record surface of the sheet-like record disk 101 and object lens 102a may be kept constant, to an actuator of the optical pickup 102 based on the focus error signal input from the preamplifier matrix 113.

The above-mentioned tracking servo unit 109 acts as a tracking servo system with the optical pickup 102 and slide motor 110, and provides, to the slide motor 110, a control signal for driving the optical pickup 2 so that the laser beam may follow the track of the sheet-like record disk 1 based on the tracking error signal input from the preamplifier matrix 113.

The above-mentioned guide servo unit 111 moves the guide member 104, instead of moving the object lens 102a so as to cause the record surface of the sheet-like record disk 101 to fall within the depth of focus of the object lens 102a. In order to perform this control operation, based on the focus error signal input from the preamplifier matrix 113, the guide member 104 is moved so that the DC offset of the signal may become minimum, and thus, the record surface of the sheet-like record disk 101 is made to fall within the depth of focus of object lens 102a.

The above-mentioned spindle servo unit 112 acts as a spindle servo system with the spindle motor 107 and guide actuators 105, and, based on the control signal from the CPU 114, controls the rotation speed or line speed of the sheet-like record disk 101 uniformly by PLL control, etc.

The above-mentioned preamplifier matrix 113 generates the focus error signal and tracking error signal from an electric signal obtained from photoelectric conversion of reflective light beam from the record surface of the sheet-like record disk 101 through the optical pickup 102.

The CPU 114 provides the control signal to the spindle servo unit 112 for causing the rotation speed/line speed of the sheet-like record disk 101 to be fixed to a predetermined speed; provides to the guide servo unit 111a projection amount control signal when vibration of abnormal amplitude is detected on the guide actuators 105; provides to the guide actuators 115 a guide retreating control signal, also, provides a pickup retreating signal to the actuator of optical pickup 102 and slide motor 110, and further provides a stop control signal to the spindle motor 117 when vibration of further larger amplitude more than a predetermined value is detected on the guide actuators 115.

As mentioned above, instead of moving the optical pickup 102a, the guide member 104 is moved so as to cause the record disk 101 to fall within the depth of focus of the object lens 102a. Specifically, the reflected light from the record disk 101 is received by the optical pickup 102, and, therefrom, the focus error signal is generated by the preamplifier matrix 113. Then, the guide member 104 is moved so that the DC offset of the focus error signal becomes minimum. For this purpose, the CPU 114, based on the S-curve of the focus error signal, controls the guide servo unit 111 so as to operate the guide member 104 so that the record surface of the record disk 101 falls within the depth of focus of the object lens 102a.

Further, the CPU 114 controls the guide actuators 105 by the control signal so as to control the projection amount of the guide member 104, when abnormal vibration is detected from a vibration sensor, so as to cause the vibration to become smaller.

When a larger abnormal vibration than a predetermined level is detected from the vibration sensor, the CPU 114 performs controls such that the guide member 104 retreats, and also, the optical pickup 102 retreats, and, also the spindle 107a stops rotation.

Such a larger abnormal vibration may be a suddenly occurring large pulse caused by collision of the sheet-like record disk and guide member, for example. For example, it is a case where the amplitude peak value of abnormal vibration more than 5 Hz exceeds 10 times of the stable state.

Moreover, the CPU 114 controls the positional deviation (or axial runout) such as surface vibration of the record disk 101 with respect to the optical pickup 102 by moving the projection amount of the guide member 104. Then, after that, before the focus servo control on the optical pickup 102 for converging the recording/reproducing beam onto the record disk 101 is locked, positioning of the guide member 104 is performed in a rough adjustment of distance between the object lens 102a and disk record surface, by changing the projection amount of the guide member 104 so as to examine the S-curve on the focus error signal obtained by this change, instead of moving the object lens 102a.

The record disk 101 chucked onto the spindle 107a is rotated thereby to the predetermined rotation speed. Then, after that, the guide member 104 is moved to approach the disk record surface to a first predetermined position. This position is such that it can be expected that the record disk 101 can float. Then, the optical pickup 102 is moved to a directory management area of the record disk 101.

This first predetermined position is determined such that a standard disk used as a design standard is used and this disk can stably float. For example, this first predetermined position is a position slightly lower than the surface of the disk 101. That is, the state in which the guide member 104 little pushes the record disk 101 is a stable state. At this time, the disk 1 bends as if a bowl is reversed.

Then, first the so-called S-curve is obtained by slightly changing the projection amount of the guide member 104 in a state in which the focus servo control is stopped. Then, after that, the focus servo control is started.

Generally, although the S-curve is obtained by adding a DC offset to the object lens and height position adjustment is carried out, the height adjustment is performed by controlling the projecting amount of the guide member 104 according to the fifth embodiment instead. Accordingly, the object lens 102a operates in a state in which no DC offset exists. Further, as large surface vibration on the record disk 101 is eliminated by the guide member 104, the actuator of the object lens 102a should not move over a wide range, and, thus, the weight thereof can be effectively reduced.

Then, the tracking servo unit 109 operates. Then, the optical pickup 102 moves inward/outward according to read-out of data, while the projection amount of the guide member 104 is controlled by the guide actuators 105 so that the DC offset of the focus servo unit 108 always becomes minimum. In this time, vibration of the guide member 104 is monitored at any time. Then, when a reference value is exceeded by the monitored vibration, the projection amount of the guide member 104 is finely controlled. Furthermore, when a threshold value is exceeded, the guide member 104 is made apart from the disk 101 immediately, then optical pickup 102 is made retreat, and the spindle 107a is stopped rotation.

Recording/reproduction of signal was carried out with this sheet-like record disk 101 and information recording/reproducing device according to the fifth embodiment as an experiment. The experimental conditions are as follows:

Record Power: 4 mW;
Erase Power: 3.5 mw;
Reproduction Power: 0.2 mW;
Cannel Clock Frequency: 100 mHz;
Minimum Mark Length: 0.15 micrometers/bit;
Track Pitch: 0.32 micrometers In the conditions, random data modulated by 1-7 modulation could be recorded by land and groove recording, and could be reproduced. This corresponds to the capacity of 18 GB. Furthermore, the recording rate could be increased.

Since, in the magneto-optical type, a record mark is formed by temperature distribution, much fine multi-pulse strategy is unnecessary. For this reason, the number of pulse divisions can be reduced in recording compared with a common multi-pulses used for a CD-RW etc. For this reason, it is not necessary to make a channel clock frequency much higher even considering the recording data rate.

In this experiment, recording/reproduction was able to be carried out under the fixed conditions from the radius of 25 mm to 58 mm of the disk 101. Although the object lens 102a may collide the sheet-like record disk 101 in case it is of a rigid body like a conventional optical disc due to surface vibration of the disk, and thereby, error may occur. However, in this experiment according to the fifth embodiment of the present invention, no such problematic matters-occurred.

The sheet-like record disk 101 and guide member 104 may contact for a moment in an vertical vibration state (vibration on approximately ±0.5 mm) before entering in a stable state from the state in which the sheet-like record disk 101 bends due to gravity in the free state. However, since the guide member 104 and the sheet-like record disk 101 approach when the guide member 104 is made to approach, the force of air flow becomes stable, and thereby, they are then apart accordingly. In order to carry out recording/reproduction, the distance between the object lens 102a of the optical pickup 102 and the record film of the disk 101 should approach into approximately 0.1 through 0.2 mm.

For this reason, control is made such that, when the guide member 104 projects and thereby the sheet-like record disk 101 is thus stabilized, the optical pickup 2 projects. The optical pickup 2 should move vertically only at the beginning after that. That is, the object lens 102a of optical pickup 102 moves greatly, when searching for the focus state. After that, as the sheet-like record disk 101 is stable on the guide member 104 as mentioned above, it is not necessary for the optical pickup 102 to move greatly. As it is thus possible for the optical pickup 102 not to need to move greatly during the stable state, the optical pickup 2 can be made light-weighted.

Accordingly, in order to achieve the light-weighted optical pickup 102, the control is made such that the optical pickup 102 projects after the sheet-like record disk 101 is stabilized. The guide member 104 is moved so that the optical pickup 2 should not move greatly, and operation of searching for the laser-beam condensation point is performed not positional control of the object lens 102a but of the guide member 104 in this embodiment. Thereby, according to the fifth embodiment of the present invention, the amount of stroke of the optical pickup 102 can be reduced remarkably into approximately ±50 through 60 micrometers, with respect to approximately 1 mm of stroke amount on a conventional optical pickup.

A sixth embodiment of the present invention will now be described. The sixth embodiment is same as the above-described fifth embodiment except that the record film of the sheet-like record disk 101 is different as follows:

150 nm of Ag reflective layer;
8 nm of SiC protection layer;
10 nm of AgInSbTeGe phase-change record layer; and
30 nm of ZnS—SiO protection layer are formed on the base member 101b by sputtering.

Then, recording/reproduction of signal was carried out onto this sheet-like record disk through the recording/reproducing device (drive device) same as that in the fifth embodiment in an experiment. The recording/reproduction of random data modulated could be recorded and reproduced according to 1-7 modulation scheme by record peak power of 5 mW, erase power of 2.7 mW, reproduction power of 0.3 mW, channel clock frequency of 66 mHz, 0.13 micrometers/bit on the minimum mark length, and land & groove recording form of track pitch of 0.32 micrometers. This is equivalent to the storage capacity of 20 GB.

Recording/reproduction was able to be carried out on the fixed conditions over the radius of 25 mm and 58 mm. Since the phase-change recording medium is used in the sixth embodiment, no magnetic head is needed. Moreover, direct overwrite is possible in this embodiment.

Figure 26:
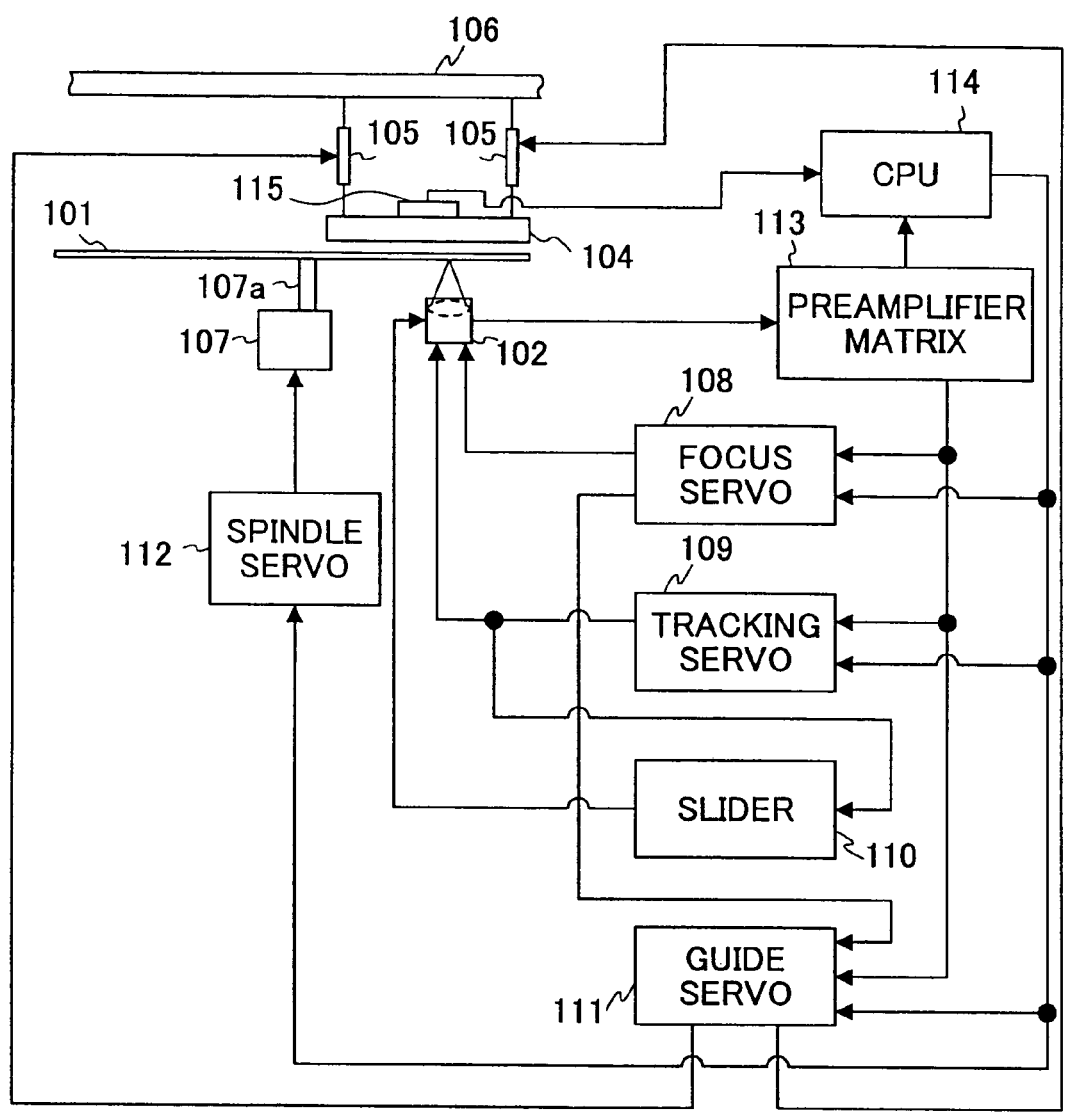
FIG. 26 shows a block diagram of a variant embodiment of the servo control system shown in FIG. 22.

FIG. 26 is a block diagram showing the servo control system which is a variant form of the same shown in FIG. 25 in the fifth embodiment. This servo control system shown in FIG. 26 is same as that shown in FIG. 25, except that a vibration sensor 115 is attached to the guide member 104. Since abnormal vibration of the sheet-like record disk 101 occurring if any is transmitted into the guide member 104, detection of such abnormal vibration can be made by the vibration sensor 115 thus provide in the guide member 104.

Figure 27:
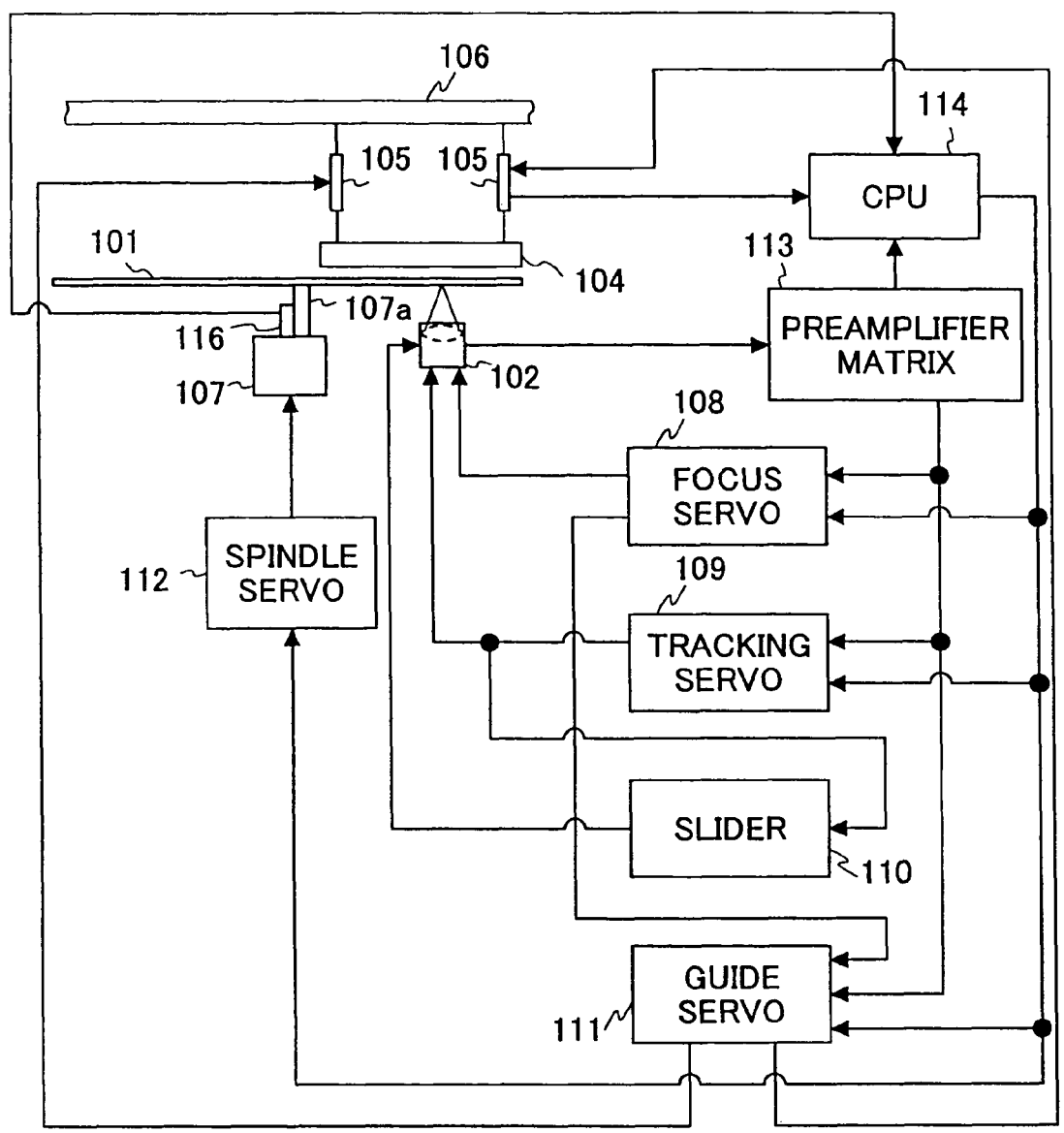
FIG. 27 shows a block diagram of another variant embodiment of the servo control system shown in FIG. 22.

FIG. 27 is a block diagram showing another variant embodiment of the servo control system of FIG. 25. The servo control system shown in FIG. 27 is same as that shown in FIG. 25 except that a vibration sensor 116 is attached to a bearing of the spindle 107a. Since abnormal vibration of the sheet-like record disk 101 occurring if any is transmitted into the spindle 107a, detection thereof may be made by means of the vibration sensor 116 provided in the spindle 107a.

Thus, according to the fifth embodiment of the present invention, even on an optical head for high recording density with a high NA and a narrow tilt margin and/or defocus margin, it became unnecessary to consider the degree of perpendicularity of the spindle, surface vibration (or axial runout) of the flexible disk-like recording medium, etc. For this reason, a low-cost high-density optical disk system is achieved.

Moreover, since the guide actuators 105 for fine positional adjustment of the guide member 104 are provided in the fifth embodiment, high assembly accuracy is not needed on the guide member 104.

Moreover, since the guide actuators 105 control the projecting amount of the guide member 104 so as to reduce the focus offset of the object lens 102a, the object lens is thus made positioned in the central point of the actuator of the object lens, and, thus, control should be made for the object lens 102a only for high-frequency surface vibration of the disk 101. Therefore, the stroke of the actuator of object lens 2a can be designed smaller.

Moreover, accuracy is not required in chucking operation of the sheet-like record disk 101 onto the spindle. This is because, as long as the positioning on the record disk 101 is made roughly, the guide member 104 itself can perform operation for searching for optimum position with respect to the present position of record disk 101 by means of the function of the guide actuators.

In case abnormal variation occurs on the sheet-like record disk 101 due to temperature, humidity, substrate thickness thereof etc. during rotation thereof, it is detected through the guide member 104 or spindle 107a. In such a case, there is a possibility that surface vibration on the disk 101 may not be effectively reduced, and the sheet-like record disk 101 and object lens 102a may collide in case the object lens 102a has a small operational distance range. However, according to the fifth embodiment, the optical pickup 102 and sheet-like record disk 101 can be protected from breakage because there is a provision which detects an extreme abnormal vibration and thereby the appropriate measures are taken for avoiding actual collision as mentioned above (for example, the optical pickup 102 itself is made retreat immediately as mentioned above).

In addition, it is possible to consider various variant embodiments of the fifth embodiment of the present invention. For example, although in the fifth embodiment the sheet-like record disk is writable, the concept of the fifth embodiment is also applicable to a disk-like recording medium of ROM type.

Thus, according to the fifth embodiment of the present invention, high-density record can be enabled by finely adjusting distance between the disk type recording medium and object lens by means of the guide member, by effectively making the movable range of the object lens smaller and reducing the weight of the optical head mechanism, and also, by improving high-frequency response thereof, etc.

Moreover, since abnormal vibration is detectable by the vibration sensor, breakage of optical head and breakage of medium are effectively avoidable.

A seventh embodiment of the present invention will now be described.

In the first embodiment described above with reference to FIG. 1, the stabilization guide member 8 for generating the Bernoulli's effect by the convex-like curved surface of arbitrary curvature in the surface on the projecting end thereof. The inventors further studied in order to attain further stabilization and simplification of recording/reproduction operation in the optical recording/reproducing device having such a stabilization guide member. As a result, they devised to adjust the tilt angles along the radius direction and along rotation tangent direction of the optical disc of the stabilization guide member. The seventh embodiment of the present invention has been devised based on this concept, and details thereof will now be described.

In the basic configuration of generating the Bernoulli's effect between the optical disk and stabilization guide member, the position of the surface vibration stabilization area on the optical disk with regard to the stabilization guide member created in case this guide member is made approach the optical disk in the direction along the rotational axis of the optical disk depends on the specification of the optical disk, the projection amount of the guide member (approaching distance), rotation speed of the disk, and so forth.

Further, this stabilization area moves along the surface of the optical disk. It became possible to set up correctly this stabilization area on the optical disk by appropriately controlling the tilt angles of the stabilization guide member along the disk radius direction and disk rotational tangential direction. In fact, by this control operation, it is possible to set up this stabilization area into an arbitrary position on the disk surface with respect to the position of the guide member. Thereby, it becomes possible to control the stabilization area on the optical disk obtained thanks to the Bernoulli's effect, and to eliminate/stabilize the surface vibration in recording/reproducing onto the optical disc.

In addition, the directions along which the tilt angle of the stabilization guide member is controlled are not limited to the optical disk radius direction and optical disk rotational tangential direction as mentioned above. It is also possible to rotate these directions along which the tilt angle of the guide member is controlled by 45°, for example. Also in such a case, the substantially the same effect can be obtained.

Further, the shape of the surface at the projection end of the stabilization guide member may also be changed from a spherical shape. For example, any special shape such as an aspherical shape may be applied as long as the Bernoulli's effect can be obtained between the stabilization guide member having such a shape of projection end and an optical disk such as to eliminate/stabilize surface vibration on the optical disk.

Further, according to the seventh embodiment of the present invention, the rotational center or tilt center of the stabilization guide member on the above-mentioned tilt angle control is set up at a position on a curved surface at a projection end of the stabilization guide member, and, this position is regarded as an operation reference position of the stabilization guide member. Thereby, it is possible to determine a spatially fixed point as the operation reference position of the stabilization guide member regardless of the above-mentioned tilt control operation of the stabilization guide member. Accordingly, even when the tilt angle of the stabilization guide member is controlled so as to control the surface vibration on the optical disk, it is possible to fix the surface vibration stabilization area on the optical disk at or around a predetermined spatial position on the optical disk. Thereby, it is possible to easily achieve stable and positive operation of the optical pickup on this position.

As to operation of the optical pickup, the laser beam emitted thereby should be incident on the above-mentioned operation reference position of the stabilization guide member vertically/perpendicularly. Also, a temporary focus position of the optical pickup before performing focus servo control should be positioned at the above-mentioned operation reference position of the stabilization guide member. For this purpose, the position of the optical pickup is controlled according to the position of the stabilization guide member. Thereby, it is possible to accurately control the focus position and tilt angle of the optical pickup with respect to an arbitrary position on the optical pickup at which surface vibration is eliminated/stabilized thanks to the Bernoulli's effect. Thereby, it is possible to perform stable recording/reproducing onto the optical disk.

Further, according to an eighth embodiment, which is a variant embodiment of the above-mentioned seventh embodiment (see FIG. 32) of the present invention, the stabilization guide member and optical pickup are previously fixed onto a common supporting member (249) in a state in which the temporary focus position of the optical pickup before performing focus servo control is positioned at the above-mentioned operation reference position of the stabilization guide member, and also, the laser beam emitted from the optical pickup is incident on the above-mentioned operation reference position of the stabilization guide member vertically. That is, a tilt angle control mechanism on the stabilization guide member is mounted on the above-mentioned common supporting member.

Thereby, it is possible to omit rough movement control on the focus position and tilt angle for the optical pickup. Such a configuration is effective for a disk drive device which does not need very fine accuracy. This is because, in this configuration, all the configuration needed for the above-mentioned rough movement control on the optical pickup can be omitted, and, thus, device cost can be effectively lowered. Further, in this configuration, it is possible to perform fine movement control on focus position and tilt angle of the optical pickup at high accuracy by providing control mechanism designed for only the fine movement control.

Moreover, by sifting the above-mentioned temporary focus position of the optical pickup from the operation reference position of the stabilization guide member along minus direction by the substrate thickness of the optical disk, in each of the above-mentioned seventh and eighth embodiments, the control accuracy of the temporary focus position of the optical pickup with respect to the optical disk can be improved, and the withdrawing action in the focus servo control can be carried out more efficiently.

Moreover, the above-mentioned operation reference position of the stabilization guide member is set at an arbitrary radius position at which recording/reproduction is performed on the optical disk, and, there, the position control and tilt angle control of the stabilization guide member is then performed so as to control the surface vibration on the optical disk at the above-mentioned operation reference position. Thereby, it is possible to achieve surface vibration elimination/stabilization thanks to Bernoulli's effect at an arbitrary radius position on the optical disk. Thereby, it is possible to perform stable recording/reproducing onto the optical disk.

Furthermore, previously, according to a test/experiment, appropriate values of control amount on position of the stabilization guide member with respect to the optical disk surface, and also, control amount on tilt angle of the stabilization guide member are obtained as setting values for each radius position on the optical disk used for recording/reproducing. Then, at an actual occasion of recording/reproducing, the position and tilt angle of the stabilization guide member are controlled according to these setting values of control amounts with respect to the relevant radius position. Thereby, it is possible to move the stabilization guide member into the appropriate position and tilt angle at high speed at which the surface vibration of the optical disk can be eliminated/stabilized properly.

Further, by providing a sensor (referred to as a gap sensor, hereinafter) for measuring a gap between the stabilization guide member and optical disk at the above-mentioned operation reference position on the stabilization guide member, feedback control on a control driving system for the stabilization guide member may be applied based on the thus-measured gap. For example, by controlling the tilt angle of the stabilization guide member so as to make the measured gap minimum, it is possible to easily achieve the surface vibration stabilization effect thanks to Bernoulli's effect at the optimum conditions. Thereby, it is possible to perform recording/reproducing at the best point on the optical disk at high quality. Alternatively, also by controlling the tilt angle of the stabilization guide member in a real-time manner so as to cause the measured gap minimum, the same effect can be obtained.

As the gap sensor for measuring the above-mentioned gap, a photonics sensor, an electrostatic capacity type displacement sensor or the like can be used. Other than them, any device which can measure the gap between an arbitrary position on the stabilization guide member and optical disk can be used.

The above-mentioned measured gap may be used as a minus correction value in determining the above-mentioned temporary focus position of the optical pickup before performing the focus servo control. Thereby, even when the floating amount of the optical disk with respect to the stabilization guide member thanks to the Bernoulli's effect is large, setting of the temporary focus position of the optical pickup can be made accurately.

Furthermore, as mentioned above, previously, according to a test/experiment, appropriate values of control amount on position of the stabilization guide member with respect to the optical disk surface, and also, control amount on tilt angle of the stabilization guide member are obtained as setting values for each radius position on the optical disk used for recording/reproducing. Then, at an actual occasion of recording/reproducing, the position and tilt angle of the stabilization guide member are controlled according to these setting values of control amounts with respect to the relevant radius position. Furthermore, according to the above-mentioned gap amount measured by means of the above-mentioned gap sensor at the time, the thus obtained position and tilt angle are further finely adjusted. Thereby, it is possible to move the stabilization guide member into further appropriate position and tilt angle at high speed at which the surface vibration of the optical disk can be eliminated/stabilized properly.

The optical information recording/reproducing device in the above-mentioned seventh embodiment of the present invention will now be described specifically with reference to FIG. 28. The configuration of this recording/reproducing device is almost same as that in the first embodiment described with reference to FIG. 1. Specifically, the optical disk 201 is generally the same as the optical disk 1 described with reference to FIG. 3. Recording/reproduction by the optical pickup 206 onto this optical disc 201 being performed from the side of the record layer 20 made of a material such as AgInSbTeGe, while the stabilization guide member 208 for controlling the surface vibration of the optical disk 201 is disposed on the side of the substrate 21 opposite to the side of the record layer 20 (see FIG. 3). The stabilization guide member 208 is formed into a shape of a pillar, and is formed into a convex with a curvature radius of 50 mm at the projection end thereof facing the optical disk 201.

Furthermore, for example, the optical disk 201 is made from a polycarbonate sheet which has a diameter of 120 mm, and a thickness of 75 micrometers is used as the base member. First, a groove of pitch 0 6 micrometers and a width 0.3 micrometers of a stamper is transferred by heat transfer on the sheet made from polycarbonate, and the following films are formed by sputtering in the stated order: sheet/Ag reflective layer of 120 nm/($ZrO_2$—$Y_2O_3$)—$SiO_2$ 7 nm/AgInSbTeGe 10 nm/ZnS—$SiO_2$ 25 nm/$Si_3N_4$ 10 nm.

The information recording area on this optical disk 201 is set as a range of (20 mm-55 mm radius) from the inner circumference diameter of 40 mm to the perimeter diameter of 110 mm. Then, through spin coat, UV resin is coated, it is made to set by ultraviolet ray irradiation and a transparent protection film with a thickness of 5 micrometers is formed. Moreover, a hard coating with a thickness of 10 micrometers is provided on the side opposite to the side of the above-mentioned transparent protection film. In addition, the hub 203 of the outer diameter of 30 mm and inner diameter of 15 mm, and the thickness of 1.1 mm is attached in the central part of this optical disc 201.

Figure 28:
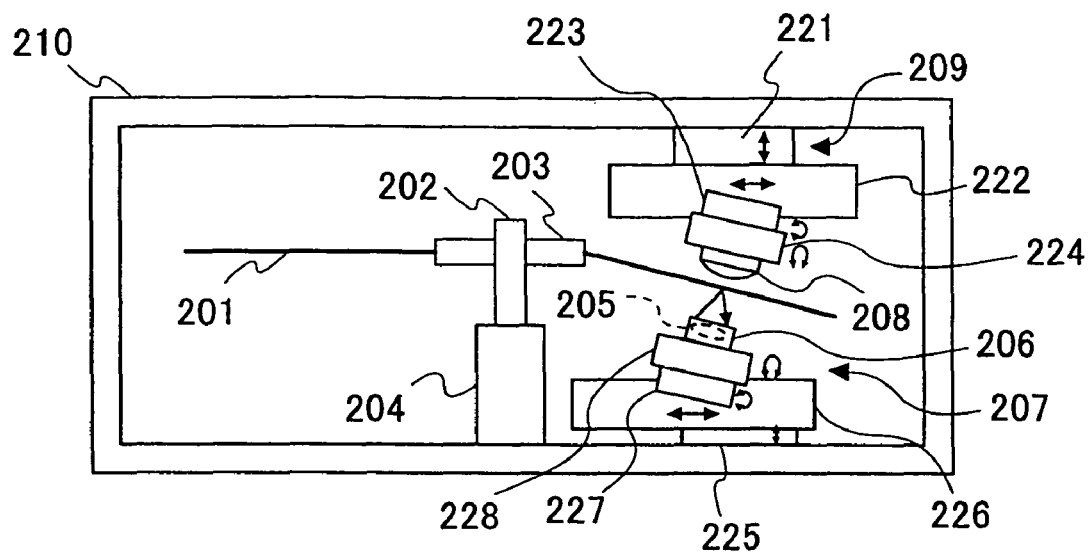
FIG. 28 shows a side elevational sectional view of an optical information recording/reproducing device in a seventh embodiment of the present invention.

In FIG. 28, a stabilization guide tilt/position adjustment control part 209 includes a disk rotation axis directional guide position adjustment control part 221; a disk radius directional guide position adjustment control part 222, a disk radius directional guide tilt angle adjustment control part 223, and a disk rotational tangent directional guide tilt angle adjustment control part 224. A pickup tilt/position adjustment control part 207 includes a disk rotational axis directional pickup position adjustment control part 225, a disk radius directional pickup position adjustment control part 226, a disk radius directional pickup tilt angle adjustment control part 227 and a disk rotational tangent directional pickup tilt angle adjustment control part 228, and movement and rotation are attained according to arrows shown in the figure, respectively.

The disk radius directional guide tilt angle adjustment control part 223 and the disk rotational tangent directional guide tilt angle adjustment control part 224 control the tilt angles of the stabilization guide member 208 with respect a surface central position thereof as the rotational center along the disk (201) radius direction and disk (201) rotational tangent direction, respectively.

The disk rotation directional pickup tilt angle adjustment control part 227 and the disk rotation tangent directional pickup tilt angle adjustment control part 228 control the tilt angles with respect to the focus position of the optical pickup 206 as the rotational center along the disk (201) radius direction and disk (201) rotational tangent direction, respectively. Further, a setting is made such that the laser beam La from the laser light source 214 in the optical pickup 206 descried with reference FIG. 4 is always incident on the stabilization guide member 208 at the above-mentioned surface central position perpendicularly, and, also, the temporary focus position of the optical pickup 206 before focus servo control is performed is positioned at the above-mentioned surface central position of the stabilization guide member 208.

The optical disk 201 is set onto the spindle shaft 202, and, then the stabilization guide member 208 is pressed onto the optical disk 201. In this state, the tilt angles of the stabilization guide member 208 along the disk radius direction and disk tangential direction are adjusted through the disk radius direction guide tilt angle adjustment control part 223 and the disk rotational tangent direction guide tilt angle adjustment control part 224. The above-mentioned adjustment is made such that the surface vibration at the surface center of the stabilization guide member 208 becomes minimum. According to the seventh embodiment of the present invention, the adjustment control amount on the displacement of the stabilization guide member 208 with respect to the optical disk 201 and the adjustment control amount on the tilt angle of the same are determined by using values previously estimated by performing trial operation according to the specification of the optical disk 201 and rotation speed of the optical disk 201.

As a result of performing the operation control on the stabilization guide member 208 and optical pickup 206 as described above, it is possible to set the surface vibration stabilization area created by the stabilization guide member 208 easily and appropriately, and, to perform recording/reproducing onto the optical disk at this area stably.

Figure 29:
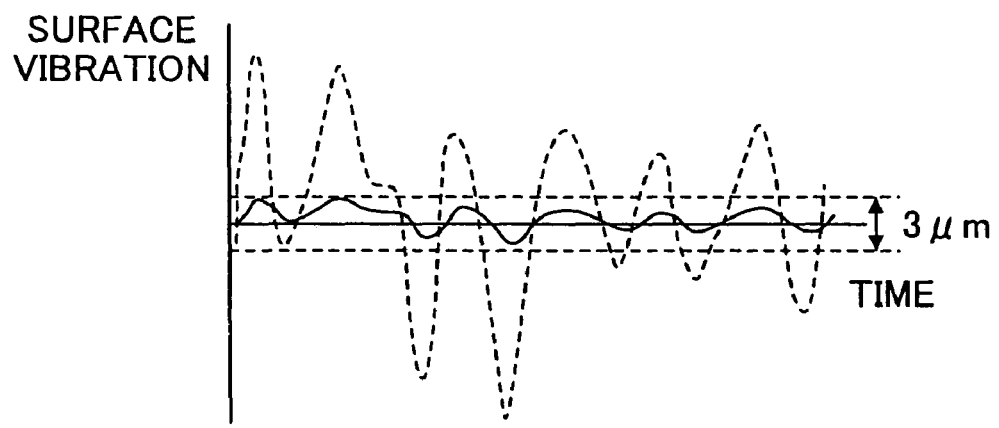
FIG. 29 illustrates a measurement result on surface vibration measured on the device shown in FIG. 28.

As a result of an experiment performed according to the above-described conditions, the surface vibration on the point at which recording/reproducing is performed by the optical pickup 206 was shown in FIG. 29. As can be seen therefrom, the surface vibration could be controlled well within 3 micrometers. In FIG. 29, the solid line denotes the surface vibration waveform at a time optimum setting was made on the tilt angle of the stabilization guide member 208 in the seventh embodiment of the present invention while the broken line denotes the same at a time the tilt angle is deviated from the optimum value.

Furthermore, as described above, the gap sensor is provided at the surface center of the stabilization guide member 208 for measuring the gap between the stabilization guide member 208 and optical disk 201, and then, the tilt angles of the stabilization guide member 208 are adjusted so as to minimize the gap, or so as to minimize the change in (or fluctuation of) the gap. Thereby, according to the experiment, it is possible to perform recording/reproducing operation at the effective surface vibration stabilization area more appropriately and at high accuracy.

According to the seventh embodiment, an electrostatic displacement sensor is used as the gap sensor. Further, according to the experiment, it could be confirmed that same effect can be obtained from both of the above-mentioned adjustment methods directed to minimization of the gap and directed to minimization of the change in (or fluctuation of) the gap.

Figure 30:
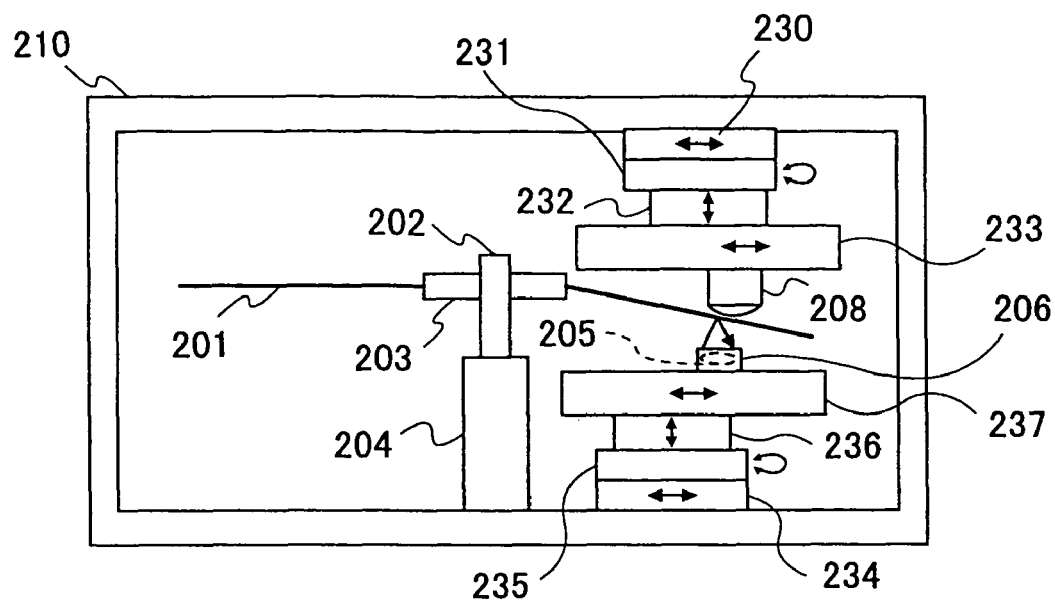
FIG. 30 shows a side elevational sectional view of an optical information recording/reproducing device in a comparison example with respect to the seventh embodiment.

FIG. 30 illustrates a configuration of a comparison example of optical recording/reproducing device with respect to the seventh embodiment. In this configuration, the same reference numerals are given to components same as those shown in FIG. 28, and description thereof is omitted. In this configuration, a disk surface direction guide positional control part 230, a disk-surface guide-moving-path inclination control part 231, a disk rotational axis directional guide position control part 232, a disk radius directional guide position control part 233, a disk-surface directional pickup position control part 234, a disk-surface pickup-moving-path inclination control part 235, a disk rotational axis directional pickup position control part 236 and a disk radius direction pickup position control part 237 are provided. These parts can move/rotate according to arrows shown in the figure, respectively. According to this comparison example, no tilt adjustment/control parts as in the seventh embodiment are provided.

Figure 31:
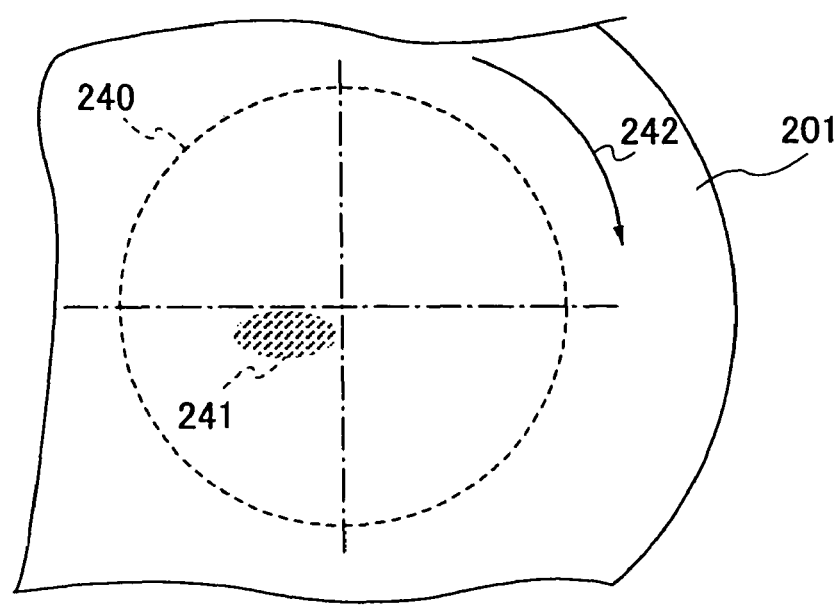
FIG. 31 illustrates a relationship between a position of the stabilization guide member and surface vibration stabilization position in the comparison example shown in FIG. 30.

Similar to the case of the seventh embodiment, surface vibration stabilization operation on the optical disk by means of the stabilization guide member 208 was performed on the above-mentioned comparison example in experimental. As a result, as shown in FIG. 31, the central position of the stabilization guide member 208 and the surface vibration stabilization area were positioned at a different position, where, in FIG. 31, 240 denotes a position of the stabilization guide member 208 projected on the optical disk 201, while 241 denotes the surface vibration stabilization area on the optical disk 201, and 242 denotes the rotation direction of the optical disk 201.

Furthermore, in the experiment performed on the comparison example shown in FIG. 30, the surface vibration stabilization area with respect to the surface of the stabilization guide member 208 varied according to the position on the optical disk along the radius direction thereof, disk rotational speed, specification of the optical disk and so forth. And thereby, it was very difficult to cause the optical pickup 206 to properly follow the surface vibration stabilization area 241, and, for this purpose, it was necessary to provide a special operation mechanism and also, to provide a complex control algorithm therefor.

Figure 32:
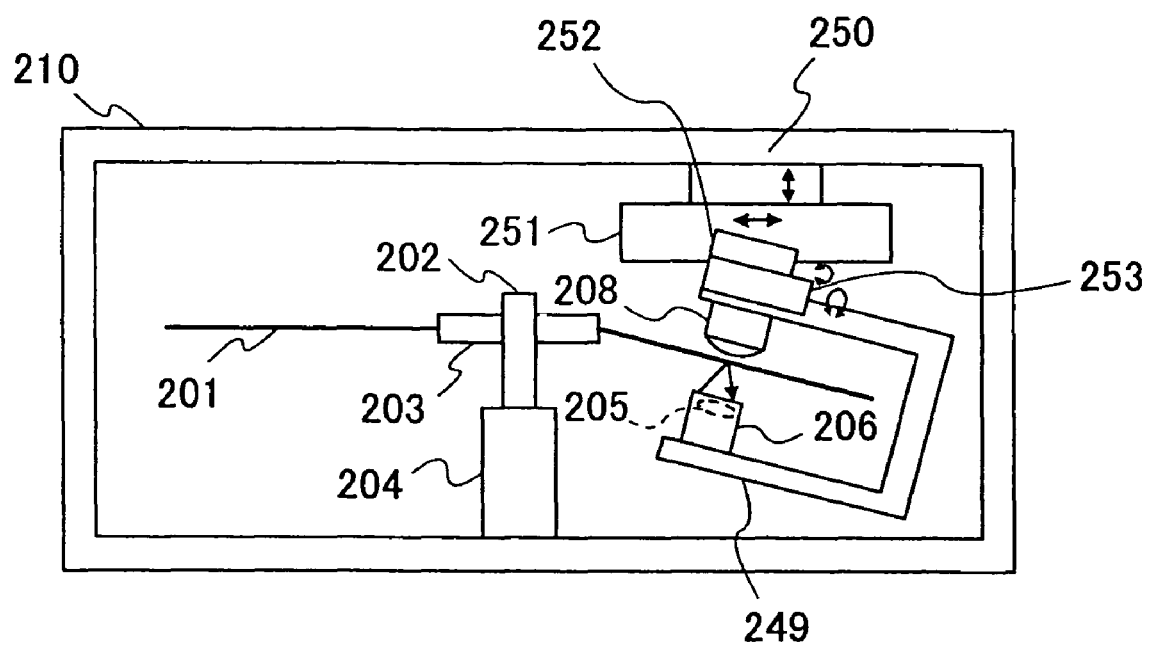
FIG. 32 shows a side elevational sectional view of an optical information recording/reproducing device in an eighth embodiment of the present invention.

FIG. 32 shows a general configuration of the information recording/reproducing device in the above-mentioned eighth embodiment of the present invention. In the configuration, the same reference numerals are given to components same as those shown in FIG. 28, and description thereof is omitted.

This eighth embodiment includes a guide pickup unit common housing 249 having a C-shape and holding the optical pickup 206 and stabilization guide member 208 in a manner such that they face one another, a disk rotational axis direction unit position adjustment control part 250, a disk radius direction unit position adjustment control part 251, a disk radius direction unit tilt angle control part 252, and a disk rotational tangential direction unit tilt angle control part 253.

The disk radius direction unit tilt angle adjustment control part 252 and the disk rotation tangent direction unit tilt angle adjustment control part 253 have mechanisms such as to control the tilt angles of the stabilization guide member 208 along the disk radius direction and disk tangential direction with respect to the surface center of the stabilization guide member 208 as the rotational center. Further, the optical pickup 206 is fixed to the common housing 249 in a state such that the laser beam emitted from the optical pickup 206 is always incident on the stabilization guide member at the surface center perpendicularly, and, also, the temporary focus position of the optical pickup 206 before performance of the focus servo control operation is located at the surface center of the stabilization guide member 208.

Also in this eighth embodiment, the optical disk 201 is set onto the spindle shaft 202, and, then the stabilization guide member 208 is pressed onto the optical disk 201. In this state, the tilt angles of the stabilization guide member 208 along the disk radius direction and disk tangential direction are adjusted through the disk radius direction unit tilt angle adjustment control part 252 and the disk rotational tangent direction unit tilt angle adjustment control part 253. The above-mentioned adjustment is made such that the surface vibration at the surface center of the stabilization guide member 208 becomes minimum.

Also according to the eighth embodiment of the present invention, the adjustment control amount on the displacement of the stabilization guide member 208 with respect to the optical disk 201 and the adjustment control amount on the tilt angle of the same are determined by using values previously estimated by performing trial operation according to the specification of the optical disk 201 and rotation speed of the optical disk 201.

As a result of performing the operation control on the stabilization guide member 208 and optical pickup 206 as described above, it is possible to set the surface vibration stabilization area created by the stabilization guide member 208 easily and appropriately, and, to perform recording/reproducing onto the optical disk at this area stably. As a result of an experiment performed according to the above-described conditions, the surface vibration on the point at which recording/reproducing is performed by the optical pickup 206 could be controlled well as in the case of the seventh embodiment. Further, as to the effect of the gap sensor and so forth, the same results were obtained as those in the case of the seventh embodiment.

According to the eighth embodiment, as the stabilization guide member 208 and optical pickup 206 are integrated into a unit as mentioned above, it is possible to simplify the operation mechanism therefor, while the same advantages as those in the seventh embodiment can be obtained. Accordingly, it is possible to effectively reduce the device costs.

As described above, in the seventh and eighth embodiments of the present invention, it is possible to easily adjust an area at which the surface vibration is eliminated/stabilized thanks to the stabilization guide member on the optical disk by controlling the tilt angles of the stabilization guide member along the radius direction of the optical disk and tangential direction of the optical disk. Thereby, it is possible to appropriately set a desired area on the optical disk which should be stabilized in surface vibration, to simplify and improve accuracy on the control of position and tilt angle of the optical pickup which performs recording/reproducing operation on this stabilization area. Accordingly, it is possible to stabilize and simplify recording/reproducing operation.

A ninth embodiment of the present invention will now be described.

When rotating the sheet-like optical disk at an arbitrary rotation speed, in order to stabilize/eliminate surface vibration at an arbitrary position along the disk radius direction in an information recording/reproducing device by means of the stabilization guide member in any of those described above, it is important to determine the position of the stabilization guide member along the direction of the rotational axis of the optical disk according to an experiment. Accordingly, even when the position along the disk radius direction and/or disk rotation speed is changed, it is possible to effectively control the surface vibration (or axial runout) on the disk by the stabilization guide member by appropriately controlling the position of the stabilization guide member along the disk rotational axis direction, as will be described now.

Requirements for controlling the surface vibration depend on the specification of the optical disk will now be described. For example, estimation is previously made by actual measurement of the position of the stabilization guide member along the disk rotational axis direction enabling well control of the surface vibration of the optical disk at any position on the optical disk along the radial direction and any disk rotation speed for every specification of the disk such as the sheet material, respective composition layers such as the substrate, record layer and so forth, mechanical property, and process conditions of the optical disk.

Then, therefrom, an adjustment pattern concerning the position of the stabilization guide member along the disk rotational axis direction is set for every specification of respective optical disks. Then, the adjustment pattern applied is appropriately selected according to the optical disk applied. Thereby, it is possible to cope with alternation of the specification of optical disk applied, sufficiently. In addition, the specification of optical disks are intricately related to many factors, and thus, it can be said that it is impossible to find out a law concerning these factors. Thus, in terms of effectiveness and practical usage, it is necessary that the most effective adjustment pattern is selected according to each particular type of the optical disk applied as mentioned above.

Figure 34:
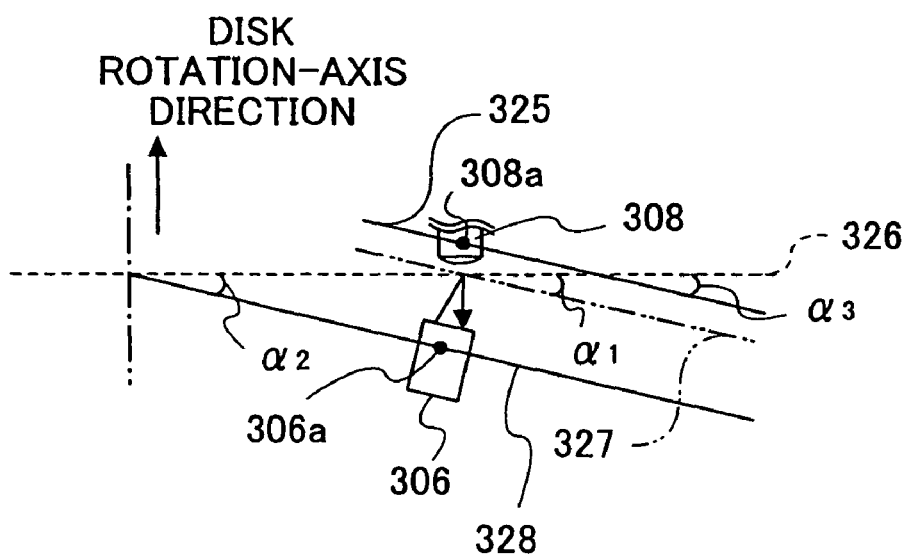
FIG. 34 illustrates a guide movement path, a pickup movement path, a stabilization point movement path, a guide movement path inclination angle, a pickup movement path inclination angle and a stabilization point movement path inclination angle in the ninth embodiment of the present invention.

Furthermore, according to an experiment, it is found that, as shown in FIG. 34, a movement path 325 of the stabilization guide member 308 along a disk radius direction along which the effect of stabilization/elimination of surface vibration by means of the stabilization guide member 308 lies along approximately a straight line for a particular disk rotation speed, and, also, is inclined from a plane perpendicular to the disk rotational axis.

In FIG. 34, 306a denotes a reference position of the optical pickup 306; 308a denotes a reference position of the stabilization guide member 308; 327 denotes a moving path of vibration stabilization point on the disk surface; 328 denotes a movement path of the optical pickup 306; α1 denotes an inclination angle of the movement path 327 (referred to as a disk vibration stabilization point movement path 327, hereinafter) of vibration stabilization point on disk surface with respect to the plane perpendicular to the disk rotational axis; α2 denotes an inclination angle of the movement path 328 (referred to as a pickup movement path 328, hereinafter) of the optical pickup 306 with respect to the plane perpendicular to the disk rotational axis; α3 denotes an inclination angle of the movement path 325 (referred to as a guide movement path 325, hereinafter) of the stabilization guide member 308 providing most effective surface vibration stabilization effect with respect to the plane perpendicular to the disk rotational axis.

Further, it is also found that the position of the guide movement path 325 along the disk rotation axis shifts while the inclination angle α3 thereof is maintained according to change in the rotational speed of the optical disk. Further, the inclination angle α3 of the guide movement path 325, the position of the guide movement path 325 and the change rate of this position with respect to the disk rotational speed defer according to every particular specification of the optical disk.

Thus, by appropriately changing the inclination angle α3 of the guide movement path 325 with respect to the plane 326 perpendicular to the disk rotation axis, and changing the position of the guide movement path 325 along the disk rotation axis, it is possible to obtain the effect of surface vibration stabilization by means of the stabilization guide member 308 regardless of the particular specification of the optical disk, and, thus, to cope with alteration of the specification of the optical disk, sufficiently.

Moreover, by adjusting the position along disk rotation axis direction of the guide movement path 325, according to the specification of the optical disk 302 applied and also disk rotation speed, it is possible to obtain the effect of surface vibration stabilization by means of the stabilization guide member 308 regardless of the disk rotation speed on the same optical disk 308. Accordingly, recording/reproduction onto the optical disk can be performed without being defined by the restriction on the recording line speed. Moreover, according to the above-described scheme, disk surface vibration stabilization is able to be achieved simply without using complicated control algorithm.

Together with the positional control of the guide movement path 325 along the disk rotation axis, positional control of the optical pickup 306 is needed corresponding to the movement of the stabilization guide member 308. In this control, it is effective, according to an experiment, to fix the positional relationship between the stabilization guide member 308 and optical pickup 306 along the disk rotation axis direction. Thereby, it becomes possible to appropriately set the position on the optical disk 301 which is stabilized in surface vibration by means of the stabilization guide member and the pre-focus distance on the optical pickup 306 at this position.

The pre-focus distance means a distance between a reference position on focus servo control with respect to the optical disk 301 in information recording/reproduction onto the optical disk 301, and it is different from a focus distance in focus servo control in response to slight surface vibration, or so.

Further, according to the experiment, it is found that the disk surface vibration stabilization area on the disk surface obtained by means of the stabilization guide member and the position of this stabilization guide member are different, and, in case where the position of the stabilization guide member along the disk radius direction and along the disk rotation axis direction are fixed, this mutual positional relationship depends on the disk rotation speed.

Figure 35:
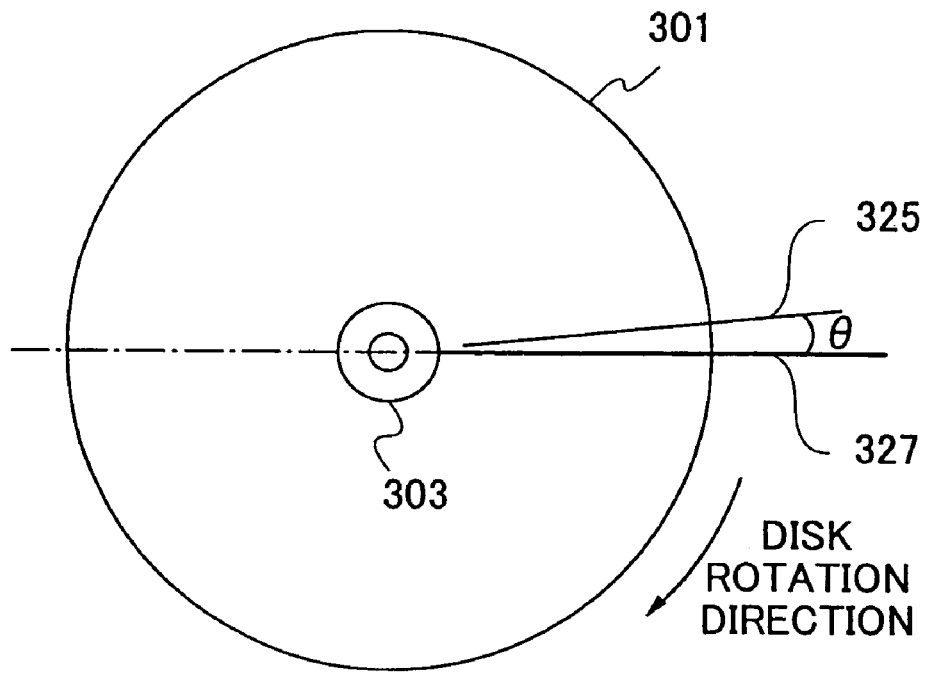
FIG. 35 illustrates the guide movement path and stabilization point movement path in the ninth embodiment of the present invention.

Further, in case the disk rotation speed is fixed, as shown in FIG. 35, both the guide movement path 325 and disk vibration stabilization point movement path 327 lie along approximately straight lines, respectively, and, also, have an angle θ therebetween. This mutual position relationship between the guide movement path 325 and disk vibration stabilization point movement path 337 depends on the disk rotation speed, and, the above-mentioned mutual positional relationship changes according to the change in disk rotation speed while above-mentioned angle θ is maintained. The manner of this phenomenon also depends on the particular specification of the optical disk 301, and, the shift angle θ between the guide movement path 325 and disk vibration stabilization point movement path 327, the mutual positional relationship therebetween and also, the change rate of the mutual relationship with respect to the disk rotation speed are different according to every particular specification of the optical disk.

Accordingly, in order to achieve information recording/reproducing in a state in which surface vibration of the optical disk is stabilized, it is effective to control/adjust the mutual positional relationship between the stabilization guide member 308 and optical pickup 306 on the disk surface at the optical disk recording/reproducing position, with respect to the disk rotation speed as a control/adjustment parameter.

For this purpose, for every particular optical disk specification, positional relationship on the disk surface between the position of the stabilization guide member 308 and the position at which the disk surface vibration is stabilized by means of the stabilization guide member 308 on the disk surface is estimated previously. Then, a stabilization guide member positional control mechanism 309 (see FIG. 33) is provided to control and move the point at which the disk surface vibration is stabilized along an arbitrary straight line along disk radius direction on the disk surface. By applying this stabilization guide member position control mechanism 309, it is possible to achieve stable information recording/reproducing at a point at which surface vibration is stabilized throughout the recording area of the optical disk 301, and, also, as it is possible to employ a straight line of the pickup movement path 328, it is possible to simplify the system configuration of the recording/reproducing device.

For this control mechanism, any one or both in combination of a control device of controlling the angle of the guide movement path 325 along the disk recording surface independently by rotating the guide movement path 325, and a control device of controlling the angle of the pickup movement path 328 along the disk recording surface independently by rotating the pickup movement path 328 is/are employed. Thereby, it is possible to control the mutual angular position between the guide movement path 325 and pickup movement path 328 arbitrarily.

Further, any one or both in combination of an adjustment method of adjusting the inclination angle of the guide movement path 325 along the disk recording surface according to the specification of the optical disk 301 and an adjustment method of adjusting the inclination angle of the pickup movement path 328 along the disk recording surface according to the specification of the optical disk 301 is/are applied. Thereby, it is possible to set the pickup movement path 328 in parallel to the disk surface vibration stabilization point movement path 327 which is determined relatively from the position of the guide movement path 325.

Furthermore, any one or both in combination of a control device of controlling the position of the guide movement path 325 along the disk recording surface independently, and a control device of controlling the position of the pickup movement path 328 along the disk recording surface independently is/are employed. Thereby, it is possible to control the mutual position relationship between the guide movement path 325 and pickup movement path 328 arbitrarily. Further, any one or both in combination of an adjustment method of adjusting the position of the guide movement path 325 along the disk recording surface according to the specification of the optical disk 301 and disk rotation speed and an adjustment method of adjusting the position of the pickup movement path 328 along the disk recording surface according to the specification of the optical disk 301 and disk rotation speed is/are applied. Thereby, it is possible to make the pickup movement path 328 to coincide with the disk surface vibration stabilization point movement path 327 which is determined relatively from the position of the guide movement path 325.

Further, by appropriately combining the above-described control devices and methods, it is possible to set the pickup movement path 328 along the disk surface vibration stabilization point movement path 327, and, thus, to achieve stable information recording/reproducing at a disk surface vibration stabilization point regardless of disk rotation speed, position of information recording/reproducing on the disk surface along disk radius direction, and the specification of the optical disk.

Figure 33:
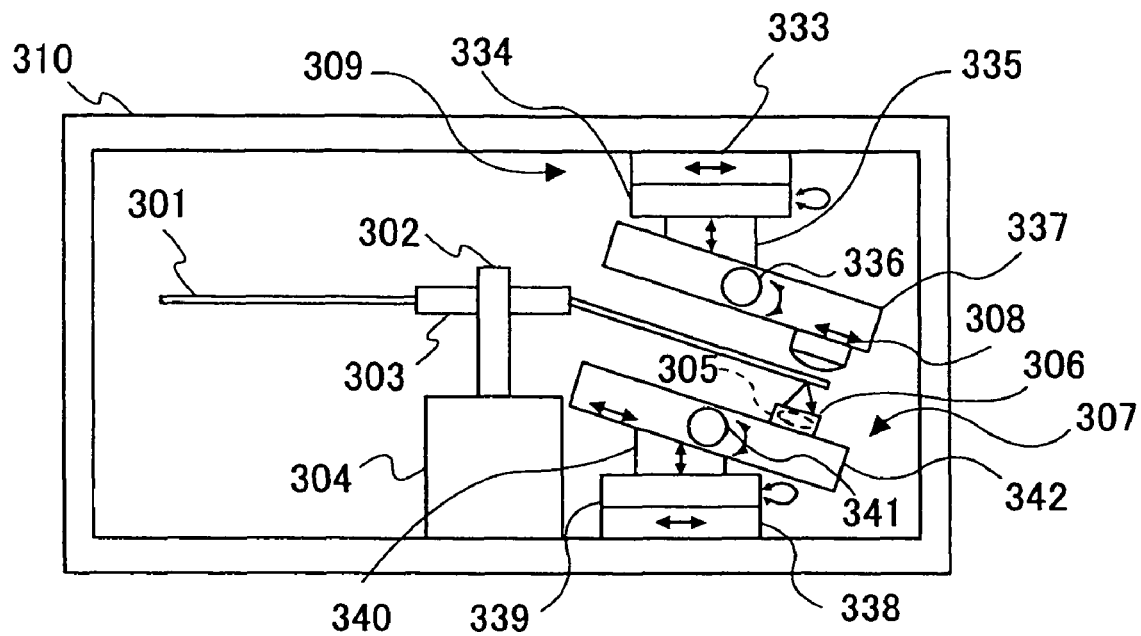
FIG. 33 shows a side elevational sectional view of an optical information recording/reproducing device in a ninth embodiment of the present invention.

The optical information recording/reproducing device carrying the optical disk drive in the above-described ninth embodiment of the present invention will now be described with reference to FIG. 33. Basically, the configuration of this recording/reproducing device is same as the recording/reproducing device in the seventh embodiment shown in FIG. 28 except the configuration relating to a mechanism of controlling the stabilization guide member 308 (208) and optical pickup 306 (206). In fact, the components 301, 302, 303, 304, 305, 306, and 308 are the same as those 201, 202, 203, 204, 205, 206, and 208 shown in FIG. 28, respectively, and description thereof is omitted.

The specification of the optical disk 301 applied is the same as the specification of the optical disk 201 according to seventh embodiment described above with reference to FIG. 3, and is referred to as a sheet specification A.

The above-mentioned stabilization guide position setting mechanism 309 in this configuration includes a disk-surface directional guide position control part 333, a disk-surface guide movement path inclination control part 334, a disk-rotation-axis directional guide position control part 335, a guide movement path inclination angle control part 336 and a disk-radius directional guide position control part 337. Further, a pickup position setting mechanism 307 includes a disk-surface directional pickup position control part 338, a disk-surface directional pickup movement path inclination control part 339, a disk rotational-axis directional pickup position control part 340, a pickup movement path inclination angle control part 341, and a disk-radius directional pickup position control part 342. They move/rotate according to arrows shown in the figure, respectively.

A pattern of movement operation of the stabilization guide member 308 and optical pickup 306 at a time of performance of information recording/reproducing onto the optical disk 301 having the above-mentioned sheet specification A is referred to as a guide pickup operation pattern A. This operation pattern A is previously prepared based on actually measured values, or the like, for particular optical disk to be applied, and, the positions of stabilization guide member 308 and optical pickup 306 are controlled according to this operation pattern A in response to the disk rotation speed and position of recording/reproducing along the disk radius direction.

The outline of the guide pickup operation pattern A will now be described with reference to FIGS. 36 and 37.

Figure 36:
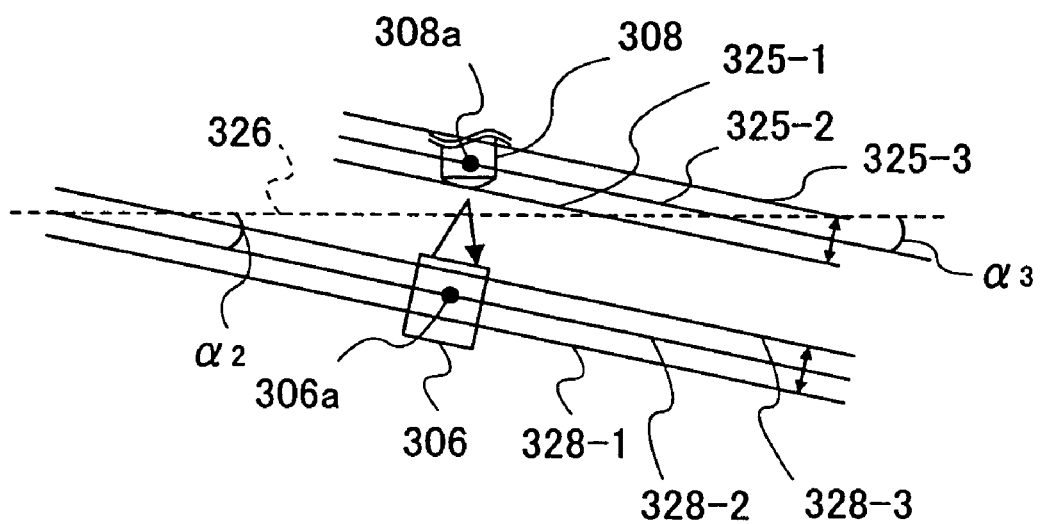
FIG. 36 illustrates a side elevational view of the guide movement path and pickup movement path in the ninth embodiment of the present invention.

As shown in FIG. 36, the guide movement path 325-1, 325-2 or 325-3 is inclined with respect to the plane 326 perpendicular to the disk rotation axis by the angle $\alpha 3$ by means of the guide movement path inclination angle control part 336. For example, this angle $\alpha 3 = 3$ (degrees). Further, the pickup movement path 328-1, 328-2 or 328-3 is inclined with respect to the plane 326 perpendicular to the disk rotation axis by the angle $\alpha 2$ by means of the pickup movement path inclination angle control part 341. For example, this angle $\alpha 2 = 3$ (degrees).

Figure 37:
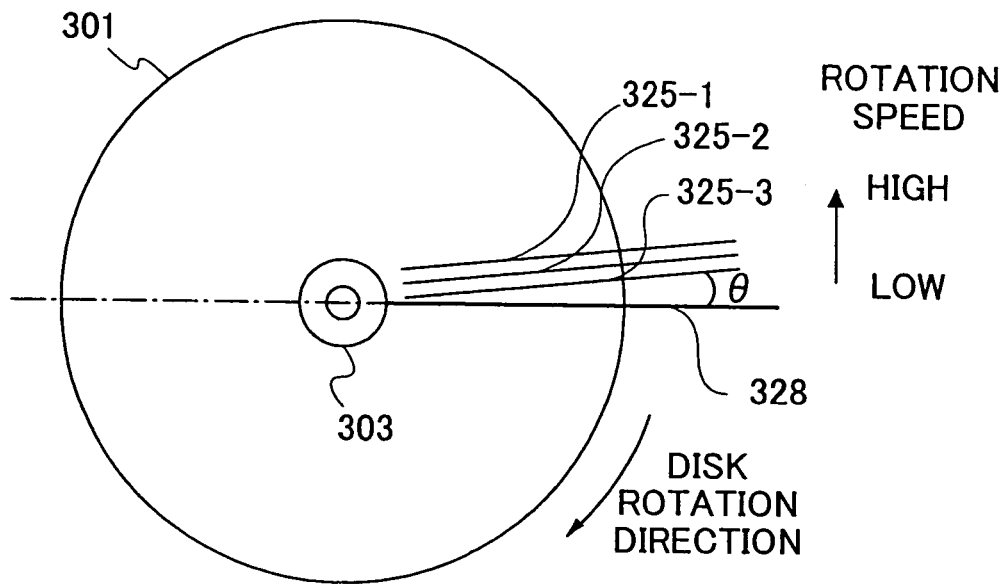
FIG. 37 illustrates a plan view of the guide movement path and pickup movement path in the ninth embodiment of the present invention.

Further, as shown in FIG. 37, the mutual angle $\theta$ between the guide movement path 325 and pickup movement path 328 on the disk surface is set as 3 (degrees) by means of the disk-surface guide movement path inclination control part 334.

The guide movement path 325 is shifted along the disk rotation axis direction by means of the disk-rotation-axis directional guide position control part 335 (see FIG. 36), and/or is shifted along the disk surface direction by means of the disk-surface directional guide position control part 333 (see FIG. 37), according to the disk rotation speed, while the above-mentioned guide movement path inclination angle α3 is maintained. The direction to be thus shifted is such as from the above-mentioned 325-3 to 325-1 as the disk rotation speed increases, i.e., the direction to cause the stabilization guide member to project toward the optical disk 301, or the direction to cause the stabilization guide member 308 to be apart from the pickup movement path 328 on the disk surface (or along the recording surface)

The direction of the pickup movement path 328 on the disk surface is fixed along a disk radius direction, and, thus, the disk-surface directional pickup position control part 338 and the disk-surface directional pickup movement path inclination control part 339 are not used, in this example.

The pickup movement path 328 is controlled by the disk-rotational-axis directional pickup position control part 340 in a manner such as to follow the guide movement path transition according to the disk rotation speed (325-1 through 325-3 shown in FIG. 36) while the distance between the stabilization guide member 308 and optical pickup 306 along the disk rotational axis direction is fixed.

Figure 38:
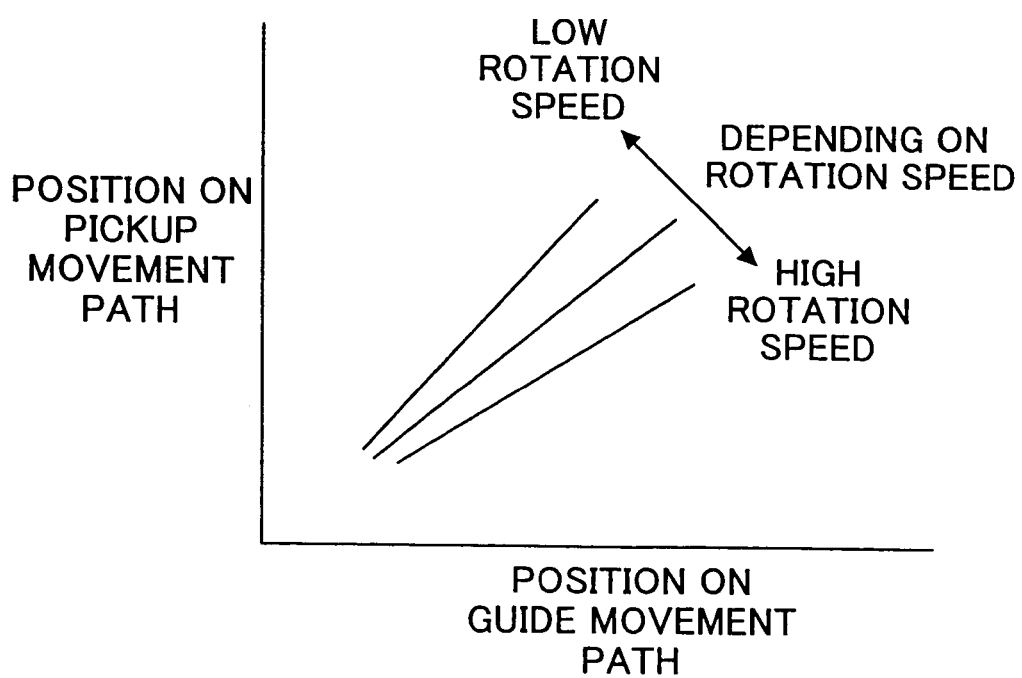
FIG. 38 shows a relationship between a position on the guide movement path and a position on the pickup movement path with respect to the disk rotation speed.

The mutual relationship between the position of the stabilization guide member 308 along the guide movement path 325 and the position of the optical pickup 306 along the pickup movement path 328 are adjusted/controlled according to a previously estimated pattern as shown in FIG. 38 on the optical disk having the sheet specification A. FIG. 38 shows a position at which surface vibration is stabilized on the optical disk along the pickup movement path 238 created when the stabilization guide member 308 is positioned at an arbitrary position along the guide movement path 325, and, a curve is obtained according to a particular disk rotation speed. As for any disk rotation speed other than those previously measured particularly, setting is made by extrapolation manner from given ones.

Figure 39:
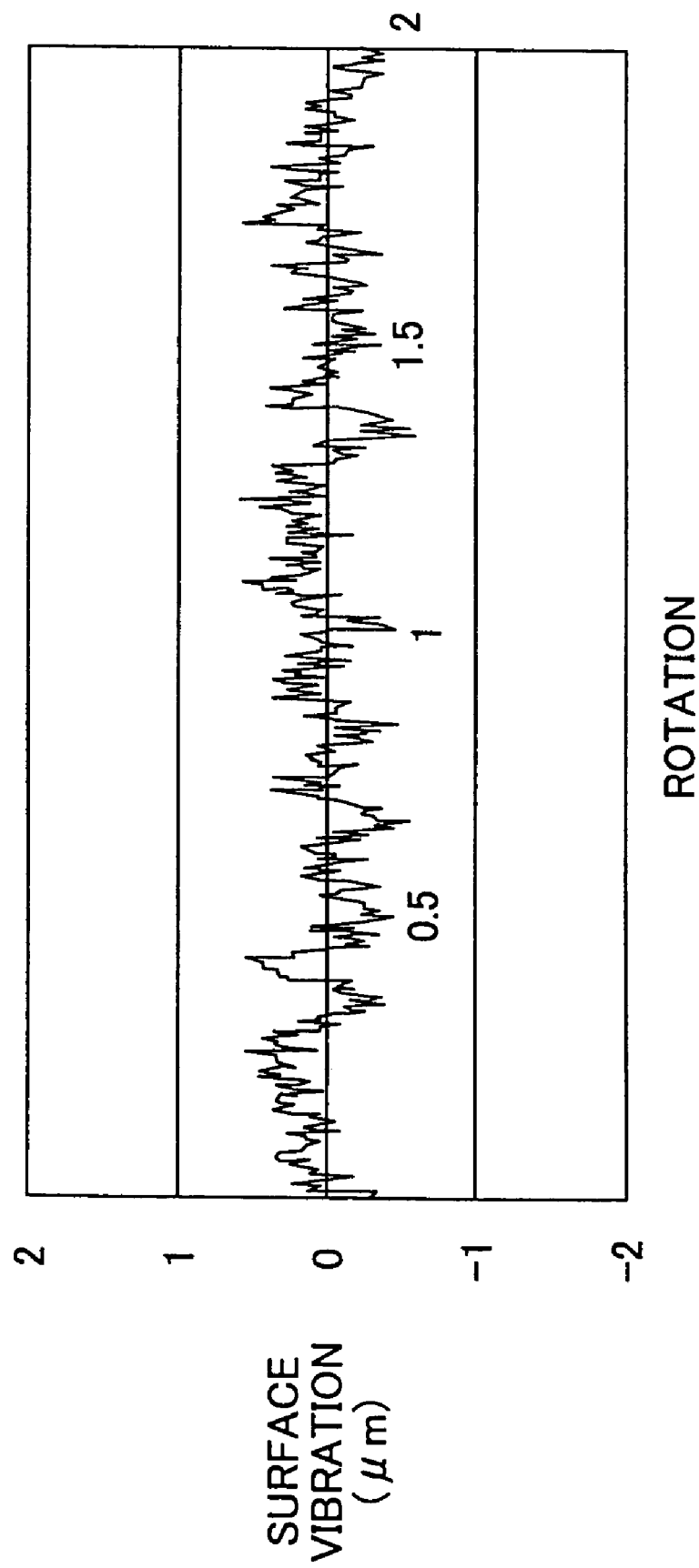
FIG. 39 illustrates a measurement result on surface vibration measured on the device shown in FIG. 33.

Thus, in an experiment on the optical disk 301 having the sheet specification A, according to the above-mentioned guide pickup operation pattern A, the positions of the stabilization guide member 308 and optical pickup 306 were controlled. Accordingly, over the information recording area in a range between 20 mm and 50 mm radius on the disk surface, the Bernoulli's effect could be obtained by means of the stabilization guide member 308 stably. Then, as shown in FIG. 39, the disk surface vibration could be controlled well within 3 micrometers at a position at which recording/reproducing is performed by the optical pickup 306. Thus, stable information recording/reproducing could be achieved.

Further, the control mechanisms for performing positional control/adjustment of the stabilization guide member 308 and optical pickup 306 have a very simple configuration. For example, in case the optical disk 301 applied is fixed to of a specific specification, the disk-surface directional guide movement path inclination control part 334, disk-rotational-axis directional guide position control part 336, disk-surface directional pickup movement path inclination control part 339 and pickup movement path inclination angle control part 341 become unnecessary, and can be configured as a simpler configuration.

Moreover, in the description of the ninth embodiment, the position of the pickup movement path 328 is fixed on the disk surface while the guide movement path 325 is controlled. However, instead, it is also possible that, as a contrary, the position of the guide movement path 325 is fixed on the disk surface while the pickup movement path 328 is controlled.

As variant embodiments of the ninth embodiment, embodiments employing the optical disk 301 having different sheet specifications B and C will now be described.

The sheet specification B is such that: the sheet member in the above-mentioned specification A is replaced by a sheet made by polyethylene telefthalate having a diameter of 120 mm, and a thickness of 100 micrometers. The sheet specification C is such that each of all the respective sputter layers of the sheet specification A is halved in thickness.

First, for each of the optical disks of the sheet specifications B and C, similarly, the guide pickup operation pattern mentioned above was previously estimated. Thus, the guide pickup operation pattern B and the guide pickup operation pattern C were determined. In addition, on each of the guide pickup operation patterns B and C, the pickup movement path 328 was fixed while the guide movement path 325 was controlled on the disk surface as in the case of the guide pickup operation pattern A.

The guide pickup operation pattern B is different from the guide pickup operation pattern A only in the mutual relationship between the position of stabilization guide member 308 along the guide movement path 325 and the position of the optical pickup 306 along the pickup movement path 328 shown in FIG. 38. Accordingly, based on the pickup operation pattern A, only this different point was changed and thus, setting was made accordingly.

The guide pickup operation pattern C is different from the guide pickup operation pattern A in the inclination angle α3 of guide movement path 325 with respect to the plane 326 perpendicular to the disk rotation axis to be adjusted by the guide movement path inclination angle control part 336. This angle is 4 degrees, and setting change was made accordingly. According to this change, the inclination angle α2 of pickup movement path 328 with respect to the plane 326 perpendicular to the disk rotation axis to be adjusted by the pickup movement path inclination angle control part 341 was also changed into the same angle.

Thus, by estimating the guide pickup operation pattern for each specification of optical disk, and then performing control of the positions of the stabilization guide member 308 and optical pickup 306 according to the thus-estimate requirements, it was possible to create the Bernoulli's effect by means of the stabilization guide member 308 regardless of the particular specification of the optical disk. Also, thereby, it was possible to well control surface vibration at a position of recording/reproducing performed by the optical pickup 306. According to the experiment, the surface vibration was controlled well within 3 micrometers in any case.

Thus, according to the ninth embodiment of the present invention, as the inclination of the guide movement path 325 with respect to the plane 326 perpendicular to the disk rotation axis direction is appropriately set, is appropriately changed according to particular specification of the optical disk 301, and, also, is appropriately shifted while the above-mentioned inclination angle is fixed, it is possible that the stabilization guide member 308 performs the surface vibration stabilization effect in the optimum conditions corresponding to the various states in bending, displacement and so forth on the optical disk. Further, as the positional relationship between the stabilization guide member 308 and optical pickup 306 along the disk rotation axis direction is fixed, it is possible that the surface vibration stabilization position on the optical disk 301 and the separating reference position of the optical pickup with respect to the optical disk 301 are properly maintained in combination therebetween.

Thereby, disk surface vibration along the disk rotation axis direction or axial runout can be well controlled thanks to air flow pressure difference according to the Bernoulli's effect at a portion on which information recording/reproducing is performed on the flexible optical disk. Thereby, it is possible to achieve high-density information recording at the stabilized portion on the optical disk. Further, even when the position along the disk radius direction, disk rotation speed, and/or disk specification are changed, it is possible to well control the surface vibration at a portion on which recording/reproducing on the optical disk is performed Further, the present invention is not limited to the above-described embodiments, and variations and modifications may be made without departing from the basic concepts of the present invention.

The present application is based on Japanese priority applications Nos. 2001-118344, 2001-228943, 2002-18323, 2001-158663, 2001-234299 and 2001-253896, filed on Apr. 17, 2001, Jul. 30, 2001, Jan. 28, 2002, May 28, 2001, Sep. 19, 2001 and Aug. 24, 2001, respectively, the entire contents of which are hereby incorporated by reference.

What is claimed is:

1. An optical information recording device comprising:
a driving part driving a flexible optical disk;
an optical writing part optically writing information onto a single record surface of the optical disk; and
a stabilization part provided on a single non-record side of the optical disk opposite the single record surface where writing/reading is performed, said stabilization part having only one stabilization surface,
wherein said optical writing part and stabilization part are opposed to one another through the optical disk, and wherein said stabilization part is provided only on said single non-record side of the optical disk, such that stabilizing of vibration of the disk along a rotation axis direction, by pressure difference of air flow at a portion on which information writing/reading is performed, occurs only on said single non-record side of the optical disk.

2. The device as claimed in claim 1, wherein said stabilization part comprises a portion protruding toward the optical disk.

3. The device as claimed in claim 1, wherein said stabilization part comprises a first portion creating a positive pressure with respect to the atmospheric pressure on the upstream side along disk rotation direction, and a second portion creating a negative pressure with respect to the atmospheric pressure on the downstream side along disk rotation direction.

4. The device as claimed in claim 1, wherein said stabilization part extends along the rotation axis direction of the optical disk.

5. The device as claimed in claim 1, wherein said stabilization part is provided as a component of said device.

6. The device as claimed in claim 1, wherein the flexible optical disk alone is loaded into a predetermined set part.

7. The optical information recording device of claim 1, wherein said pressure difference of air flow is created according to Bernoulli's law.

8. A disk cartridge comprising:
a flexible optical disk driven by a driving part of an optical information recording device; and
a stabilization part provided on a single non-record side of the optical disk opposite to a single record surface where writing/reading is performed by an optical writing part of the optical information recording device, said stabilization part having only one stabilization surface,
wherein said optical writing part and stabilization part are opposed to one another through the optical disk, and wherein said stabilization part is provided only on said single non-record side of the optical disk, such that stabilizing of vibration of the disk along a rotation axis direction, by pressure difference of air flow at a portion on which information writing/reading is performed, occurs only on said single non-record side of the optical disk.

9. A method of controlling an optical recording/reproducing device which comprises a driving part driving and rotating a flexible optical disk; a pickup performing optical writing/reading onto a single recording surface of the optical disk, and a stabilization guide member provided on a single non-record side of the optical disk opposite to the single recording surface for stabilizing surface vibration of the optical disk at a portion on which writing/reading is performed by pressure difference of air flow, comprising the steps of:
adjusting a mutual position along the disk between the stabilization guide member and pickup along both the single recording surface and the single non-record side of the optical disk according to the rotation speed of the optical disk, wherein
the stabilization guide member is positioned by a stabilization guide member positional control mechanism,
the pickup is positioned by a pickup position setting mechanism, and
the stabilization guide member is provided only on said single non-record side of the optical disk, such that stabilizing of vibration of the disk along the rotation axis direction, by pressure difference of air flow at said portion on which information writing/reading is performed, occurs only on said single non-record side of the optical disk.

10. The method as claimed in claim 9, wherein a movement path of the stabilization guide member is rotated along the single non-record side of the optical disk so that adjustment of the movement direction is performed.

11. The method as claimed in claim 10, wherein a rotation angle of the movement path of the stabilization guide member is adjusted according to a particular type of the optical disk.

12. The method as claimed in claim 9, wherein a movement path of the pickup is rotated along the single recording surface of the optical disk so that adjustment of the movement direction is performed.

13. The method as claimed in claim 12, wherein a rotation angle of the movement path of the pickup is adjusted according to a particular type of the optical disk.

14. The method as claimed in claim 9, wherein a position of a movement path of the stabilization guide member is adjusted along the single non-record side of the optical disk.

15. The method as claimed in claim 14, wherein the position of the movement path of the stabilization guide member is adjusted along the single non-record side of the optical disk according to a particular type of the optical disk.

16. The method as claimed in claim 9, wherein a position of a movement path of the pickup is adjusted along the single recording surface of the optical disk.

17. The method as claimed in claim 16, wherein the position of the movement path of the pickup is adjusted along the single recording surface of the optical disk according to a particular type of the optical disk.

18. A method of controlling an optical recording/reproducing device which comprises a driving part driving and rotating a flexible optical disk; a pickup performing optical writing/reading onto a recording surface of the optical disk, and a stabilization guide member provided only on a single side of the optical disk opposite to a side of a recording surface, and stabilizing surface vibration of the optical disk at a portion on which writing/reading is performed by pressure difference of air flow, comprising the steps of:

adjusting a mutual position along the disk recording surface between the stabilization guide member and pickup along the recording surface of the optical disk according to the rotation speed of the optical disk, wherein the stabilization guide member is positioned by a stabilization guide member positional control mechanism, the pickup is positioned by a pickup position setting mechanism, and wherein a relationship between the position of the stabilization guide member and a surface vibration stabilization position along the recording surface of the optical disk in case the rotation speed of the optical disk is changed is previously measured, and, the position of the stabilization guide member along the recording surface of the optical disk is adjusted so that the surface vibration stabilization position on the optical disk moves along a straight line in a radius direction of the optical disk.

19. An optical recording/reproducing device comprising:
a driving part driving and rotating a flexible optical disk;
a pickup performing optical writing/reading onto a single recording surface of the optical disk;
a stabilization guide member provided on a single non-record side of the optical disk opposite to the single recording surface for stabilizing surface vibration of the optical disk at a portion on which writing/reading is performed by pressure difference of air flow; and
an adjustment control part adjusting a mutual position along the disk between the stabilization guide member and pickup along both the single recording surface and the single non-record side of the optical disk according to the rotation speed of the optical disk; and
wherein said stabilization guide member is provided only on said single non-record side of the optical disk, such that stabilizing of surface vibration of the disk, at said portion on which writing/reading is performed, by pressure difference of air flow, occurs only on said single non-record side of the disk.

20. The device as claimed in claim 19, wherein said adjustment control part performs adjustment of a moving direction of said stabilization guide member by rotating a movement path of the stabilization guide member along the single non-record side of the optical disk.

21. The device as claimed in claim 19, wherein said adjustment control part performs adjustment of a moving direction of said pickup by rotating a movement path of the pickup along the single recording surface of the optical disk.

22. The device as claimed in claim 19, wherein said adjustment control part performs adjustment of a position of a moving path of said stabilization guide member along the single non-record side of the optical disk.

23. The device as claimed in claim 19, wherein said adjustment control part performs adjustment of a position of a moving path of said pickup along the single recording surface of the optical disk.

24. An optical recording/reproducing device comprising:
a driving part driving and rotating a flexible optical disk;
a pickup performing optical writing/reading onto a recording surface of the optical disk;
a stabilization guide member provided only on a single side of the optical disk opposite to a side of a recording surface, and stabilizing surface vibration of the optical disk at a portion on which writing/reading is performed by pressure difference of air flow; and
an adjustment control part adjusting a mutual position along the disk recording surface between the stabilization guide member and pickup along the recording surface of the optical disk according to the rotation speed of the optical disk; and
further comprising a storage part storing a measurement result of a relationship between the position of the stabilization guide member and a surface vibration stabilization position along the recording surface of the optical disk measured in case the rotation speed of the optical disk is changed, said adjustment control part performing, based on the measurement result, the position of the stabilization guide member along the recording surface of the optical disk being adjusted so that the surface vibration stabilization position on the optical disk moves along a straight line in a radius direction of the optical disk.

* * * * *